(12) United States Patent
Leatherbury et al.

(10) Patent No.: US 7,194,001 B2
(45) Date of Patent: *Mar. 20, 2007

(54) TIME DIVISION MULTIPLEXING OVER BROADBAND MODULATION METHOD AND APPARATUS

(75) Inventors: Ryan M. Leatherbury, Austin, TX (US); Robert Edward Lee Johnson, Austin, TX (US)

(73) Assignee: Advent Networks, Inc., Austin, TX (US)

( * ) Notice: Subject to any disclaimer, the term of this patent is extended or adjusted under 35 U.S.C. 154(b) by 406 days.

This patent is subject to a terminal disclaimer.

(21) Appl. No.: 10/835,976

(22) Filed: Apr. 30, 2004

(65) Prior Publication Data

US 2004/0218606 A1 Nov. 4, 2004

Related U.S. Application Data

(63) Continuation of application No. 09/804,104, filed on Mar. 12, 2001, now Pat. No. 6,763,025.

(51) Int. Cl.
*H04J 14/08* (2006.01)
*H04H 1/00* (2006.01)
*H04N 7/173* (2006.01)

(52) U.S. Cl. ............. 370/395.64; 370/466; 370/474; 398/58; 398/74; 725/109; 725/119

(58) Field of Classification Search .......... 370/395.64, 370/466, 474; 398/58, 74; 725/109, 119
See application file for complete search history.

(56) References Cited

U.S. PATENT DOCUMENTS

| | | |
|---|---|---|
| 4,533,948 A | 8/1985 | McNamara et al. |
| 5,526,034 A | 6/1996 | Hoarty et al. |
| 5,544,161 A * | 8/1996 | Bigham et al. ............. 370/397 |
| 5,557,316 A | 9/1996 | Hoarty et al. |

(Continued)

FOREIGN PATENT DOCUMENTS

EP 0730383 9/1996

(Continued)

OTHER PUBLICATIONS

PCT-International Search Report dated Oct. 22, 2002 for Application No. PCT/US02/07238, filed Mar. 11, 2002.

*Primary Examiner*—Alpus H. Hsu
(74) *Attorney, Agent, or Firm*—Dillion & Yudell LLP

(57) ABSTRACT

A packet switch router that processes downstream digital information to provide dedicated bandwidth to each subscriber destination on a hybrid fiber coax (HFC) network. The router includes a network module that terminates a network connection, a switch that forwards data from the network module, and a channel module. The channel module includes a switch interface, a cell processing engine, one or more modulators, and a radio frequency (RF) transmitter network. The switch interface forwards packetized data from the switch to the cell processing engine. The cell processing engine organizes the packetized data into multiple data streams, encapsulates data in each stream into data cells, and multiplexes the data cells into a multiplexed cell stream. Each modulator is configured to modulate a multiplexed cell stream into an analog signal. The RF transmitter network up converts and combines a plurality of analog signals into a combined electrical signal for transmission.

18 Claims, 11 Drawing Sheets

U.S. PATENT DOCUMENTS

| | | |
|---|---|---|
| 5,648,958 A | 7/1997 | Counterman |
| 5,666,358 A | 9/1997 | Paratore et al. |
| 5,666,487 A | 9/1997 | Goodman et al. |
| 5,680,338 A | 10/1997 | Agarwal et al. |
| 5,684,799 A | 11/1997 | Bigham et al. |
| 5,696,765 A | 12/1997 | Safadi |
| 5,708,961 A | 1/1998 | Hylton et al. |
| 5,740,075 A | 4/1998 | Bigham et al. |
| 5,742,713 A | 4/1998 | Sanders et al. |
| 5,745,837 A | 4/1998 | Fuhrmann |
| 5,768,539 A | 6/1998 | Metz et al. |
| 5,808,767 A | 9/1998 | Williams et al. |
| 5,812,786 A | 9/1998 | Seaholtz et al. |
| 5,822,324 A | 10/1998 | Kostresti et al. |
| 5,847,751 A | 12/1998 | Safadi |
| 5,889,765 A | 3/1999 | Gibbs |
| 5,896,382 A | 4/1999 | Davis et al. |
| 5,926,476 A | 7/1999 | Ghaibeh |
| 5,963,561 A | 10/1999 | Lu |
| 5,991,308 A * | 11/1999 | Fuhrmann et al. ..... 370/395.53 |
| 6,041,051 A | 3/2000 | Doshi et al. |
| 6,041,056 A * | 3/2000 | Bigham et al. ........ 370/395.64 |
| 6,226,294 B1 * | 5/2001 | Caves ................... 370/395.61 |
| 6,285,681 B1 | 9/2001 | Kolze et al. |
| 6,307,868 B1 | 10/2001 | Rakib et al. |
| 6,356,555 B1 | 3/2002 | Rakib et al. |
| 6,366,585 B1 | 4/2002 | Drapper et al. |
| 6,392,994 B1 * | 5/2002 | Dubuc ....................... 370/230 |
| 6,459,703 B1 | 10/2002 | Grimwood et al. |
| 6,490,727 B1 | 12/2002 | Nazarathy et al. |
| 6,507,592 B1 | 1/2003 | Hurvig et al. |
| 6,507,872 B1 | 1/2003 | Geshwind |
| 6,539,003 B1 | 3/2003 | Agarwal et al. |
| 6,671,278 B1 * | 12/2003 | McBride et al. ....... 370/395.41 |
| 6,697,345 B1 * | 2/2004 | Corrigan et al. ............ 370/330 |
| 6,751,224 B1 * | 6/2004 | Parruck et al. .......... 370/395.6 |

FOREIGN PATENT DOCUMENTS

| | | |
|---|---|---|
| EP | 1 079 553 A2 | 9/2001 |
| EP | 1 130 841 A1 | 9/2001 |
| WO | WO 00/52880 | 9/2000 |
| WO | WO 01/99342 | 12/2001 |

* cited by examiner

TIME DIVISION MULTIPLEXING OVER BROADBAND MODULATION METHOD AND APPARATUS

PRIORITY CLAIM

This application is a continuation of U.S. patent application Ser. No. 09/804,104, filed on Mar. 12, 2001 now U.S. Pat. No. 6,763,025, and entitled, "Time Division Multiplexing Over Broadband Modulation Method and Apparatus," the contents of which are incorporated herein by reference.

FIELD OF THE INVENTION

The present invention relates to information delivery and distribution, and more particularly, to a time division multiplexing over broadband modulation method and apparatus that enables the delivery of allocated, unshared and deterministic bandwidth to subscribers in a network.

DESCRIPTION OF RELATED ART

The demand for broadband content by business and residential subscribers is continually increasing. Broadband content includes multiple types of entertainment programming, communications and data, such as broadcast television channels, video on demand, streaming video, multimedia data, internet access, voice-over-IP, etc. To meet the increasing demand, it is necessary to increase bandwidth to each subscriber and to improve quality of service. Current delivery technologies include several variations of DSL (digital subscriber line) technology, such as ADSL (asymmetrical DSL) and the like, which uses telephony technology, cable modem systems using television technology and HFC (hybrid fiber coax) distribution networks, 2-way wireless local loop (WLL), including 2-way satellite, etc. The existing legacy technology for providing broadband content is becoming increasingly inadequate to meet the demand.

DSL technology is a method of delivering data over a twisted pair of copper wires or twisted pair cables, and typically uses the Public Switched Telephone Networks (PSTN). There are several major problems with provisioning video services over the existing PSTN and twisted pair cables (network plant). The existing network plant is not uniform and most of the plant is old with poor copper conditions that cause signal loss and line noise. In fact, ADSL cannot be provisioned for a large portion of the population over the existing plant because of significant distances to the closest DSL Access Multiplexor (DSLAM) and poor conditions of the existing plants. In addition, ADSL currently has a limited downstream bandwidth, and inherently provides a very limited return bandwidth. ADSL is not adequate for many types of content originating at a subscriber destination, such as video conferencing and the like because of its bandwidth limitations and characteristics.

Cable modem systems for delivery If data services using Data-Over-Cable Service Interface Specifications (DOCSIS) utilize the television broadcast spectrum and television technology to broadcast so-called broadband data to subscribers. One problem with delivery of broadband data (video on demand, streaming video, etc.) using existing HFC networks is the limitation on available delivery spectrum. The television data delivery systems have been established to deliver data to subscribers over a television broadcast spectrum extending from approximately 15 Megahertz (MHz) to approximately 860 MHz. Delivery of analog television downstream to the subscriber occupies the spectrum between approximately 54 MHz to 550 MHz, which leaves a relatively small range of spectrum for the delivery of digital information over HFC cable modem systems. The diplex filter separating the downstream from the upstream is located within the frequency range of approximately 42 to 54 MHz in an extended sub-split frequency plan, which is common for most consumer-based HFC systems. Therefore, the two effective delivery frequency ranges using typical consumer-based HFC systems are those between approximately 15–42 MHz (upstream) and those between approximately 550–860 MHz (downstream).

Data-Over-Cable Service Interface Specifications (DOCSIS) is a standard that specifies the methodology for delivering data services over an HFC plant. DOCSIS defines a Cable Modem Termination System (CMTS), which is an entity used to deliver data services over an HFC network from a central distribution point. These legacy systems use a shared frequency channel to broadcast all data to every downstream subscriber. The s, hared channel is generally 6 MHz wide providing a total data bandwidth of approximately 27–38 megabits per second (Mbps) for digital information. The channel, however, is shared among many subscribers, so that the data rate varies dramatically depending upon the time of use and the number of subscribers simultaneously logged on. The quality of service is particularly low during popular usage time periods. An exemplary legacy system might distribute the shared channel among 4 separate nodes, each serving approximately 500 subscribers or more, so that resulting downstream data rate is often relatively low. The upstream shared channel is usually smaller, such as 3.2 MHz or less, and a "poll and grant" system is employed to identify data for upstream transmission. The resulting upstream performance is often no higher (and sometimes less) than a standard 56 Kbps modem.

It is desired to provide a system and method for distributing information via existing and future communication networks that meets the increasing demand for broadband content.

SUMMARY OF THE INVENTION

A packet switch router according to embodiments of the present invention processes downstream digital information at a point of distribution to provide dedicated bandwidth for each of a plurality of subscriber destinations in a hybrid fiber coax (I-WC) network. The packet switch router includes a network interface module that terminates a network connection, a switch that forwards packetized data from the network interface module, and at least one channel module. The channel module includes a switch interface, a cell processing engine, one or more modulators, and a radio frequency (RF) transmitter network. The switch interface receives and forwards packetized data from the switch to the cell processing engine. The cell processing engine forwards the packetized data into multiple data streams, encapsulates the packetized data in each data stream into data cells, and multiplexes the data cells of each the data streams into a multiplexed stream of data cells. Each modulator is configured to modulate a corresponding multiplexed stream of data cells into an analog signal. The RF transmitter network upconverts and combines a plurality of analog signals into a combined electrical signal for transmission.

A channel module in accordance with embodiments of the present invention includes an interface that receives packetized data, a cell processing engine, a modulator, and an RF transmitter network. The cell processing engine includes a switch that forwards the packetized data into one or more data streams, an encapsulator that encapsulates the packetized data in each data stream into data cells, and a channelizer that multiplexes the data cells of each data streams into a multiplexed stream of data cells. In one embodiment, the cell processing engine includes a frame processor that decapsulates the packetized data in one format and re-assembles packets into a different format. For example, the packetized data may be re-assembled back into IP packets. The cell processing engine may further include a packet adaptation procedure (PAP) processor that frames the re-assembled packets in each data stream with a frame header including a length value indicative of the size of each packet. The encapsulator may further include a cell convergence procedure (CCP) processor that generates the data ceils by segmenting framed packets and encapsulating each segment with a CCP header. The CCP header includes a pointer value indicative of the location of a next frame header in a stream of data cells. In a particular embodiment, the CCP processor adds a synchronization value in accordance with MPEG-2 to spoof an MPEG data stream. The CCP processor may be configured to pad partial segments with at least one null value to create equal-sized data cells. The CCP processor may further be configured to generate null data ceils if input packetized data is not available to maintain a continuous synchronous data stream.

In more particular embodiments, the channelizer operates to organize the multiplexed stream of data cells into cell groups, where each cell group includes multiple time slots. The channelizer inserts data cells from each of data stream according to assigned time slots. A memory may be included, which stores a lookup table with time slot assignments for each data stream. In a particular embodiment, the lookup table maps timeslots to destination IP addresses corresponding to each data stream, where the destination IP addresses each correspond to a subscriber destination. The modulator may include an encoder or the like that adds redundant data to each data cell prior to transmission to enable the receiver to reconstruct data cells in the event of lost or erroneous data. In such configuration, the cell processing engine may be configured to insert a delay between each data cell of the multiplexed stream of data cells while transmitting to the modulator to maintain timing between the cell processing engine and the modulator. In one embodiment, the modulator includes a randomizer, an encoder, and a quadrature amplitude modulator (QAM). A QAM-256 modulator is contemplated to achieve high data throughput in the downstream direction. The encoder may be a Reed-Solomon encoder or the like. Several multiplexed data cell streams are contemplated depending upon the particular data throughput that is desired. In multiple data stream configurations, the cell processing engine outputs more than one multiplexed data cell stream, each provided to a corresponding modulator. The RF transmitter network includes a combiner that combines multiple frequency channels into a single electrical signal.

It is appreciated that each data stream may correspond to one of multiple downstream subscriber destinations. The process of converting each data stream into a stream of cells enables multiplexing the cells from multiple data streams. This results in a single multiplexed data stream that is used to service multiple subscribers. Furthermore, dividing the stream into cell groups, each group having a fixed number of time slots or transport channels, enables each subscriber to have a dedicated downstream bandwidth. For example, in a particular embodiment employing 6 MHz channels and QAM-256 modulation, each frequency channel is capable of supporting approximately 40 Mbps data throughput. Time division multiplexing or time slot channelization of the frequency channel allows the 40 Mbps throughput to be further sub-divided. For example, organizing the cell stream into eight different transport channels allows each transport channel to support approximately 5 Mbps. Thus, eight different subscriber destinations may each be allocated a dedicated channel having 5 Mbps bandwidth. Of course, a given subscriber destination may be allocated multiple time slots to achieve an incremental increase in the dedicated bandwidth to that subscriber. For example, 3 of 8 transport channels assigned to a single subscriber destination provides approximately 15 Mbps to that subscriber destination.

A method of processing digital information by a point of distribution in accordance with embodiments of the present invention provides dedicated bandwidth to multiple subscriber destinations via an HFC network. The method includes forwarding data packets into multiple data streams, framing each data packet in each data stream, segmenting encapsulated data packets into data segments, encapsulating data segments of each data stream into data cells to form a corresponding cell streams, multiplexing the cell streams into a multiplexed cell stream, and modulating the multiplexed cell stream into a modulated signal within a frequency channel. The method may further include receiving and processing digital information into data packet information. The method may further include assembling the data packet information into data packets.

The framing may include appending a packet header including a length value indicative of the size of the data packet. The segmenting may include incorporating the packet header in a first segment for each segmented data packet. The encapsulating data segments may include appending a cell header to each data segment, where the cell header includes an offset value indicating a beginning of a next segmented data packet in the multiplexed cell stream. The encapsulating may include adding a synchronization value in accordance with the MPEG-2 format, which is particularly advantageous in that off-the-shelf components may be used to reduce cost and development time. The method may further include verifying that each offset value is compatible with a length value for a corresponding segmented data packet. The cell header may include a synchronization value to enable synchronization with the downstream subscriber destination equipment. The encapsulating may further include padding incomplete data ceils with null values to achieve equal-sized data cells in the multiplexed cell stream. The multiplexing may include inserting data ceils from each cell stream into the multiplexed cell stream in a round-robin manner.

In a more particular embodiment, the multiplexing may include organizing the multiplexed cell stream into cell groups, where each cell group has an equal number of time slots, and inserting data ceils from each Cell stream into the time slots of each cell group. The method may further include assigning at least one time slot of the cell group to each data stream, and inserting data cells from each cell stream into assigned time slots. The method may farther include sending the multiplexed cell stream as a synchronous cell stream to a modulator.

After multiplexing and before modulating, the method may include modifying periodic synchronization values within cell headers that are appended to each data cell, scrambling a payload of each data cell within the multiplexed cell stream, and encoding data cells in the multiplexed cell stream. The encoding may be according to any suitable encoding scheme, such as according to Reed-Solomon or the like. The modulation may be according to any known or later developed modulation techniques, such as quadrature amplitude modulation (QAM) or the like as previously described.

The multiplexing may include multiplexing the cell streams into multiple cell streams, each multiplexed in a similar manner. Modulating is performed on each multiplexed cell stream to achieve a corresponding modulated signal within a corresponding one of multiple frequency channels. The method may further include combining the frequency channels into a single electrical-signal. The method may include converting the electrical signal into an optical signal for transmission to an optical node.

A method of providing dedicated bandwidth to each of multiple subscriber destinations for delivering source information over an HFC network is similar to the method describe above, and includes modulating a multiplexed cell stream into an analog signal in a frequency channel, converting the analog signal to an optical signal, and transmitting the optical signal to the subscriber destinations over the HFC network. The method may further include receiving data packets at a distribution hub, decapsulating the data packets to obtain IP packet data, and re-assembling the IP packet data into IP packets. The method may further include receiving an optical signal from a headend and converting the optical signal into the data packets. The forwarding digital information may include determining digital addresses associated with the subscriber destinations. The method may include converting the digital information into data packets, segmenting the data packets in each data stream into packet segments, framing the packet segments with frame headers, and encapsulating framed packet segments into the data cells, where each data cell includes a cell header. The method may further include transmitting the optical signal to an optical node, converting, by the optical node, the optical signal to an electrical signal, and transmitting the electrical signal from the optical node to the subscriber destinations via a coaxial cable.

BRIEF DESCRIPTION OF THE DRAWINGS

For a more complete understanding of the present invention, reference is now made to the following description taken in conjunction with the accompanying drawings in which like reference numerals indicate like features and wherein.

DETAILED DESCRIPTION

Figure 1:
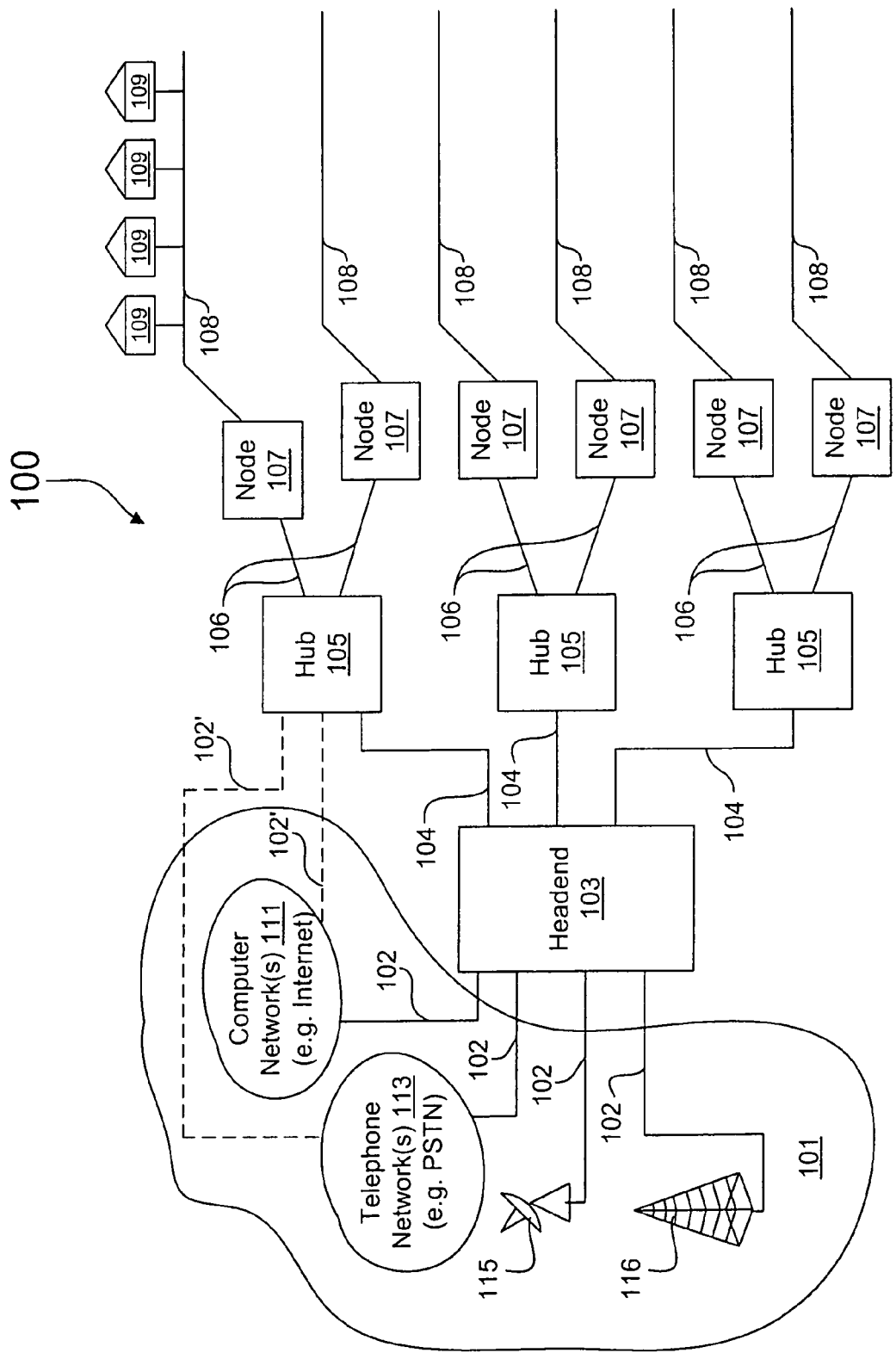
FIG. 1 is a block diagram of a communication network architecture according to an exemplary embodiment of the present invention.

FIG. 1 is a block diagram of an exemplary communication system 100 with an exemplary network architecture. One or more sources 101 are coupled via appropriate communication links 102 to deliver source information to a headend 103, which further distributes the source information to one or more distribution hubs 105 via respective communication links 104. Each distribution hub 105 further distributes source information to one or more nodes 107 via communication links 106, where each node 107 in turn distributes the source information to one or more subscriber destinations 109 via subscriber medium links 108. In the embodiment shown, bi-directional communication is supported in which subscriber information from any one or more of the subscriber destinations 109 is forwarded to a corresponding distribution hub 105. Depending upon the type of subscriber information and the architecture implementation, the subscriber information may further be forwarded by a distribution hub 105 to an appropriate source 101, either directly or via the headend 103.

It is noted that the headend 103, the distribution hubs 105 and the nodes 107 may generically be referred to as points of distribution for source and subscriber information. Each point of distribution supports a successively smaller geographic area. The headend 103, for example, may support a relatively large geographic area, such as an entire metropolitan area or the like, which is further divided into smaller areas, each supported by a distribution hub 105. The areas supported by each distribution hub 105 is further divided into smaller areas, such as neighborhoods within the metropolitan area, each supported by a corresponding node 107.

Many different types of sources 101 are contemplated, such as one or more computer networks 111, one or more telephone networks 113, one or more satellite communication systems 115, one or more off-air antenna systems 116 (e.g. microwave tower), etc. The computer networks 111 may include any type of local, wide area or global computer networks, such as including the Internet or the like. The telephone networks 113 may include the public switched telephone network (PSTN). The satellite communication systems 115 and/or the antenna systems 116 may be employed for reception and delivery of any type of information, such as television broadcast content or the like. The headend 103 may also include video on demand (VOD) equipment (not shown). Depending upon particular configurations, any one or more of the sources 101 may be coupled directly to one or more of the distribution hubs 105 in the alternative or in addition to being coupled to the headend 103 as illustrated by communication links 102'. For example, one or more of the computer networks 111 and the telephone networks 113 are shown coupled to a distribution hub 105 in addition or in the alternative. The headend 103 includes appropriate equipment for data transmission, such as, for example, internal servers, firewalls, IP routers, signal combiners, channel re-mappers, etc.

Each of the communication links (102, 102', 104, 106, 108) may be any appropriate type of medium, such as electrical or fiber optic cables or the like, or any combination of mediums, such as including both electrical and optical media or multiple optical media, etc. For example, in one embodiment, each of the communication links 102 and 102' includes optical media for communicating analog optical information, such as between the headend 103 and a satellite communication system 115 or an antenna system 116, and/or 1000Base-X Ethernet for communicating digital data and information between the headend 103 and any computer or telephone network 111, 113. Also, the communication links 106 comprise optical fibers or cables that are distributed between each node 107 and a corresponding distribution hub 105. The network architecture may employ a hybrid fiber coax (HFC) distribution network in which the subscriber medium links 108 comprises coaxial cables that are distributed from each node 107 to the respective subscriber destinations 109. In this configuration, the nodes 107 are optical nodes for conversion between optical and electrical formats. The communication links 104 may also comprise optical links, such as, for example, SONET (Synchronous Optical Network) links or the like. It is understood that any known or future developed media is contemplated for each communication link. In an HFC embodiment, for example, each node 107 receives an optical signal from an upstream point of distribution, converts the optical signal to a combined electrical signal and distributes the combined electrical signal over a coaxial cable to each of several subscriber destinations 109 of a corresponding geographic serving area. Subscriber information is forwarded in electrical format and combined at each node 107, which forwards a combined optical signal upstream to a corresponding one of the distribution hubs 105 via respective communication links 106.

Each subscriber destination 109 includes customer premises equipment (CPE) 1001 (FIG. 10), such as set-top boxes or cable modems or the like that tunes, decodes, and de-modulates source information from the combined electrical signal addressed or otherwise intended for the particular subscriber destination 109. The CPE at each subscriber destination 109 includes a modulating device or the like that encodes, modulates and up converts subscriber information into RF signals. The upstream RF signals from each of the subscriber destinations 109 are transmitted on a subscriber medium 108 to a corresponding node 107. A separate upstream channel of the upstream portion of the cable spectrum used for upstream communications may be assigned to each of the subscriber destinations 109 to prevent interference with downstream communications. The upstream RF signals are provided to the node 107, which includes an upstream optical transceiver or the like that converts the subscriber RF signals to an optical signal. For example, laser in the node 107 may be used to convert the return signal to an optical signal and send the optical return signal to an optical receiver at the distribution hub 105 over another fiber optic cable.

The source and subscriber information may include any combination of video, audio or other data signals and the like, which may be in any of many different formats. The source information may originate as fixed- or variable-size frames, packets or ceils, such as Internet protocol (IP) packets, Ethernet frames, Asynchronous Transfer Mode (ATM) cells, etc., as provided to the distribution hubs 105. Any such type of digital information in fixed- or variable-sized frames, packets or cells is referred to herein as "packetized" data. The packetized data includes one or more destination addresses or the like indicating any one or more specific subscriber devices at the subscriber destinations 109. In exemplary embodiments of the distribution hubs 105 as described herein, the packetized data is converted and delivered to the subscriber destinations 109 employing time-division multiplexing (TDM) over broadband modulation. Such TDM over broadband modulation enables the delivery of allocated, unshared and deterministic bandwidth to the subscribers in the communication system 100. The CPE at each subscriber destination 109 includes the appropriate communication equipment to receive, demodulate and decode the TDM over broadband information to deliver the original content to the subscriber. Upstream subscriber information may be handled in a similar manner, and will not be further described herein.

It is noted that many different modulating frequencies and techniques are contemplated for both downstream and upstream communications. Modulation techniques may include, for example, Frequency Shift Keying (FSK), Quadrature Phase-Shift Keying (QPSK), as well various types of Quadrature Amplitude Modulation (QAM), such as QAM 16, QAM 64, QAM 256, etc., among other modulation techniques. Also, each frequency or "physical" channel may have any predetermined bandwidth, such as 1 MHz, 3 MHz, 6 MHz, 12 MHz, etc. Each channel typically includes a separate downstream and upstream channel separated in frequency, where the corresponding down and up stream channels may have the same or different channel width. Further, the modulation technique employed for each downstream channel may be the same or different than the modulation technique employed for each upstream channel.

In one embodiment, the communication system 100 is an HFC system that supports analog television broadcast transmission in which broadcast television channels are allocated to a particular frequency range of the overall available RF cable television spectrum (5 MHz–1 GHz). The remaining portion of the RF cable television spectrum is utilized to assign data channels including any combination of downstream and upstream channels. For example, some HFC systems implement an extended sub-split frequency plan with a return band, which extends from 5 to 42 MHz, and a forward band, which extends from 52 to 750–860 MHz. It is understood that the particular frequency ranges described herein are exemplary only and that any frequency allocation scheme may be employed depending upon the desired configuration. In one exemplary embodiment, the entire forward band is segmented into 6 MHz channels according to the channelization plan implemented by the particular I-WC network operator. For typical HFC plants supporting analog television broadcasts, 80 analog channels are transmitted in the forward band between 53 and 550 MHz. In such HFC networks, satellite signals and local analog stations are mapped to 6 MHz broadcast channels within the forward band at the headend 103. Each 6 MHz forward band channel may contain an analog channel or multiple digital channels that are MPEG encoded. Each 6 MHz channel is upconverted to a frequency within the forward band according to the appropriate channelization plan.

The return band (5 42 MHz) and the remaining forward band spectrum, including frequency ranges 550 to 750–860 MHz, is allocated to subscriber digital channels and/or data transmission for dedicated bandwidth to each subscriber destination 109. For example, the frequency range 550 to 860 MHz is allocated for downstream channels and the frequency range 5 to 42 MHz is allocated for upstream channels. The frequency range 42–54 MHz is the location of a diplex filter that separates the downstream from the upstream communications. Diplex filters allow for bi-directional communication over the shared HFC fiber and coaxial medium using Frequency Division Multiplexing (FDM). The basic diplex filter consists of a high pass and a low pass filter in parallel followed by an amplifier that are both driven from the same source.

In alternative embodiments of the communication system 100, such as an all-digital HFC system, a substantial portion or the entire available spectrum is utilized to assign channels to each of the subscribers. In an all-digital HFC network, for example, there is no requirement for broadcast transmission of analog channels over the same frequencies used to transmit broadcast channels using off-air frequencies (i.e. Channel 2 at 54 1V[Hz in the HRC frequency plan). As a result, the filter frequency settings on the diplex filter in an all-digital network may allow increased spectrum allocation for upstream communications. For instance, mid-split and high-split frequency plans, which are suitable for an all-digital network, allocate the 5–86 MHz and 5–186 MHz ranges, respectively, for upstream transmission. Consequently, all-digital networks allow more upstream bandwidth for interactive services such as data over cable services. In these all-digital embodiments, the relatively large bandwidth otherwise consumed by television broadcast information is available for channel assignments. This provides a significant advantage since a very clean portion of the RF spectrum (e.g., 50–300 MHz) may be employed for data communication. Each user may be allocated a greater amount of bandwidth or a greater number of subscribers may be served for each coaxial cable. A different frequency spectrum split may be utilized to increase upstream bandwidth availability, and enables a symmetrical configuration with equal downstream and upstream bandwidth. Embodiments with a smaller geographic serving area provide a reduced noise node so that each subscriber destination 109 receives a cleaner signal, typically without the need for amplification.

One significant benefit of the embodiments of the communication system 100 described herein is the ability to deliver allocated, unshared and deterministic bandwidth to individual subscribers. Thus, data destined for a particular subscriber destination 109 is assigned a specific and unshared bandwidth that is available only to that subscriber. This provides the ability to deliver time-dependent or isochronous type services to each subscriber destination 109, such as video, voice over IP, bi-directional audio content (e.g., a telephone connection), etc., that is not otherwise possible in a network in which data over cable delivery methodologies that use contention- or arbitration-based bandwidth allocation schemes are implemented. Bandwidth allocation may be controlled by a bandwidth manager or the like at each distribution hub 105. The bandwidth manager allocates each subscriber destination 109 unshared and deterministic bandwidth in both down and upstream directions.

Figure 2:
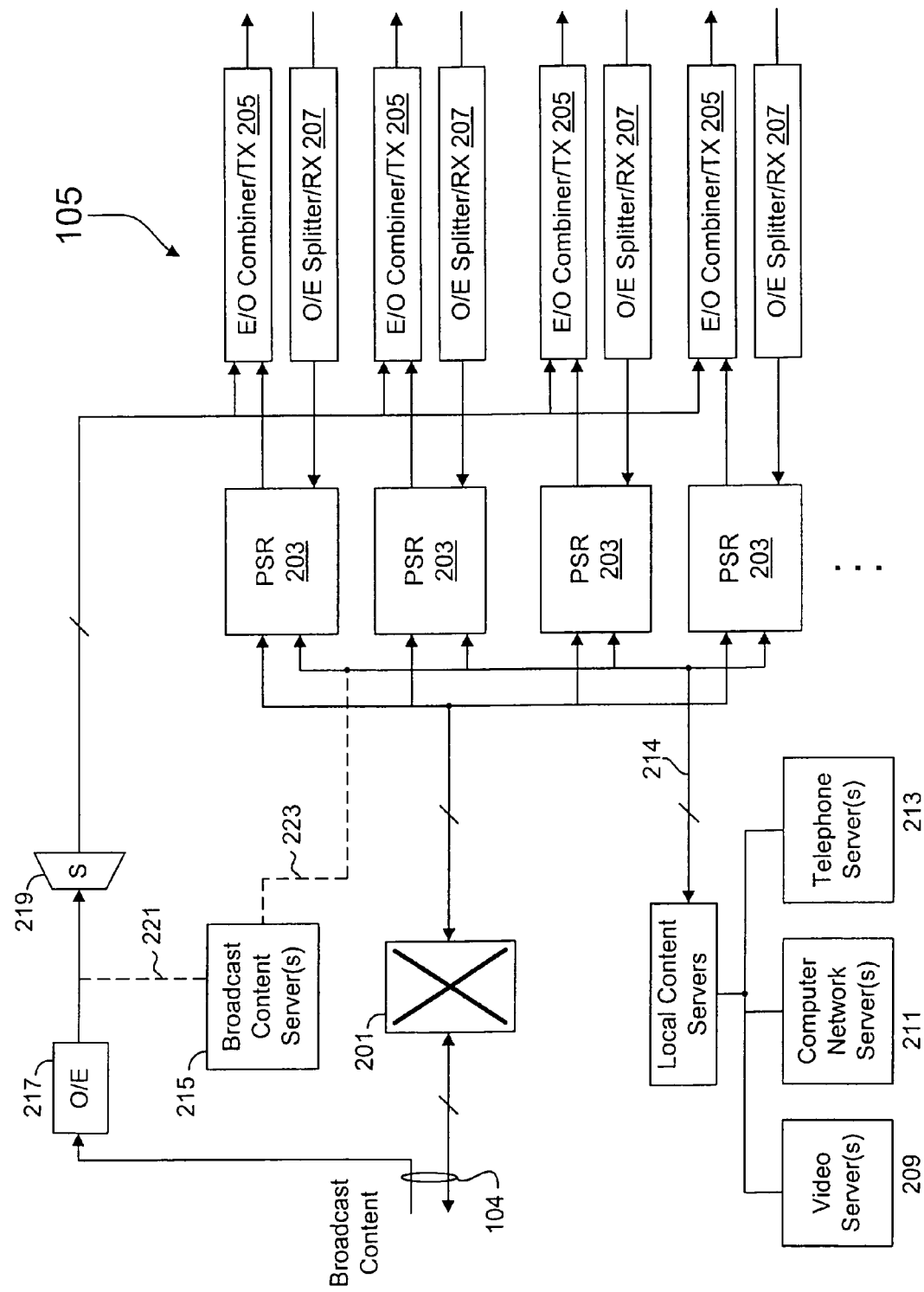
FIG. 2 is a simplified block diagram of an exemplary embodiment of any of the distribution hubs of FIG. 1.

FIG. 2 is a simplified block diagram of an exemplary embodiment of any one or more of the distribution hubs 105 of FIG. 1. In the embodiment shown, the distribution hub 105 includes a switch 201 that receives and forwards digital information, such as data and content, between the upstream sources via the communication link 104, such as the sources 101 and/or the headend 103, and one or more (N) packet switch routers (PSRs) 203. The switch 201 and each PSR 203 may be configured to communicate via optical media or the switch 201 may include optical to electrical (O/E) conversion. In one embodiment, the switch 201 is an Ethernet-type switch that forwards Ethernet packets.

Each packet includes source and destination addresses enabling the switch 201 to forward the packets from a source to the appropriate destination in both upstream and downstream directions. In a more particular embodiment, the switch 201 includes one or more switches each operating according to 100Base-X or 1000Base-X Ethernet at a data rate of 100 Mbps or 1 gigabit per second (Gbps), respectively. Each PSR 203 is interfaced with the switch 201 via separate and respective optical or electrical 100Base or 1000Base Ethernet electrical or optical links 214. It is understood, however, that the present invention is not limited to any particular architecture, protocol or technology and that other network technologies may be used, such as Asynchronous Transfer Mode (ATM) technology or the like.

As further described below, each PSR 203 encodes, modulates and up converts source digital information received from the switch 201 into one or more downstream channels, and forwards RF signals to respective inputs of at least one of one or more RF electrical to optical (E/O) combiners and transmitters 205. Each RF channel has a predetermined frequency bandwidth, such as 6 MHz in a standard United States configuration, and thus supports a particular amount of data transmission depending upon the modulation technique employed. In a particular embodiment employing QAM-256 as the modulation technique, each 6 MI-Iz physical channel has a data throughput capacity of approximately 40 Mbps. It is appreciated that alternative modulation techniques other than QAM-256 may be employed. The PSR 203 may be implemented in a modular and scalable format to combine multiple downstream channels into at least one combined electrical signal distributed via a single RF connector. Also, each PSR 203 may be implemented to provide multiple combined electrical signals via corresponding RF connectors, each supporting multiple downstream channels. Each combiner/TX 205 combines the RF signals from one or more combined electrical signals from one or more PSRs 203 into a single combined optical signal that is transmitted via a fiber optic cable or the like to a corresponding one of the nodes 107. It is noted that each distribution hub 105 may transmit to one or more nodes 107, each serving a different geographic serving area.

Upstream subscriber digital information is received by a corresponding one of several RF optical to electrical (O/E) receivers and splitters 207, which receives an optical signal with combined subscriber information via an optical cable, converts the combined optical signal to a combined subscriber electrical signal and splits or duplicates and forwards the combined subscriber electrical signal to corresponding one or more of the PSRs 203. It is noted that the upstream signals are typically received over diverse return paths from separate nodes. In the embodiments described herein, the upstream signals are combined to a single signal that is received by a common PSR input connector. As further described below, each PSR 203 is timed to one or more upstream channels and extracts a corresponding return RF signal. Each PSR 203 demodulates and decodes the return RF signal into corresponding subscriber data packets for each upstream channel. The subscriber data packets are then forwarded to the switch 201 for processing and/or forwarding as necessary.

It is noted that although a separate combiner/TX 205 and a separate splitter/RX 207 is shown for each PSR 203, multiple combiner/TXs 205 and splitter/RXs 207 may be provided for a single PSR 203 or multiple PSRs 203 may use a single combiner/TX 205 and/or a single splitter/RX 207 depending upon particular configurations and data capabilities of the respective devices.

The distribution hub 105 may include one or more local content servers that convert or otherwise deliver data and content between the distribution hub 105 and the subscriber destinations 109 and/or upstream sources, such as the sources 101 and/or the headend 103. For example, the distribution hub 105 may include one or more video servers 209 that communicate video content, one or more computer network servers 211 that enable communication with the internet and/or other computer networks, and one or more telephone network servers 213 that enable communication with the PSTN and/or other telephonic networks. Also, the distribution hub 105 may include one or more broadcast content servers 215 for receiving and forwarding broadcast content and information, such as television broadcast channels or the like. Such broadcast content and information may be selectively delivered within individual subscriber channels or collectively broadcast with the subscriber channels as previously described. Each of the servers 209–215 represents one or more server computers and includes any additional functionality as necessary or desired. For example, the video servers 209 may incorporate one or more video functions including video-on-demand (VOD) and may further include an MPEG (Moving Pictures Experts Group) converter or the like that converts broadcast video content from analog to digital or otherwise transcodes video content from one digital form to another. The telephone network servers 213 may include or otherwise incorporate one or more telephone switches or the like. The illustrated servers 209–215 are exemplary only and other types of servers and content are contemplated. Alternatively, the servers 209–215 may be replaced by a generic data server for exchanging information with the headend 103.

In one embodiment, broadcast content is received from an upstream source via the communication link 104 and provided to an O/E converter 217. The electrical broadcast content is then provided to a splitter 219 and distributed to respective inputs of one or more of the combiner/TXs 205. The broadcast content may be in either analog or digital format. Each combiner/TX 205 is configured to receive and combine the broadcast television information with the source information forwarded within assigned channels from one or more of the PSRs 203. In particular, each combiner/TX 205 operates to overlay the broadcast content information, such as television broadcast channels or the like, with the digital subscriber channels to develop a combined optical signal for downstream transmission. The CPE at each of one or more of the subscriber destinations 109 is configured to receive, split and forward the broadcast content information to an appropriate subscriber device, such as a set top box or television or the like. This embodiment of the communication system 100 is particularly applicable to consumer-based networks in which it is desired that cable television channels or the like be available directly from the subscriber medium routed to the subscriber destinations 109 without the need for further conversion.

In an alternative embodiment, the electrical broadcast content is delivered to the broadcast content server 215 via alternative connection 221, where the broadcast content server 215 is coupled to one or more of the PSRs 203 via separate connections 223 in a similar manner as the other local content servers 209–213. In this manner, the broadcast content and information is selectively delivered to subscriber destinations 109 via corresponding subscriber channels. This embodiment of the communication system 100 conforms to the all-digital configuration in which the entire available spectrum is available for digital communications via the subscriber channels.

Figure 3:
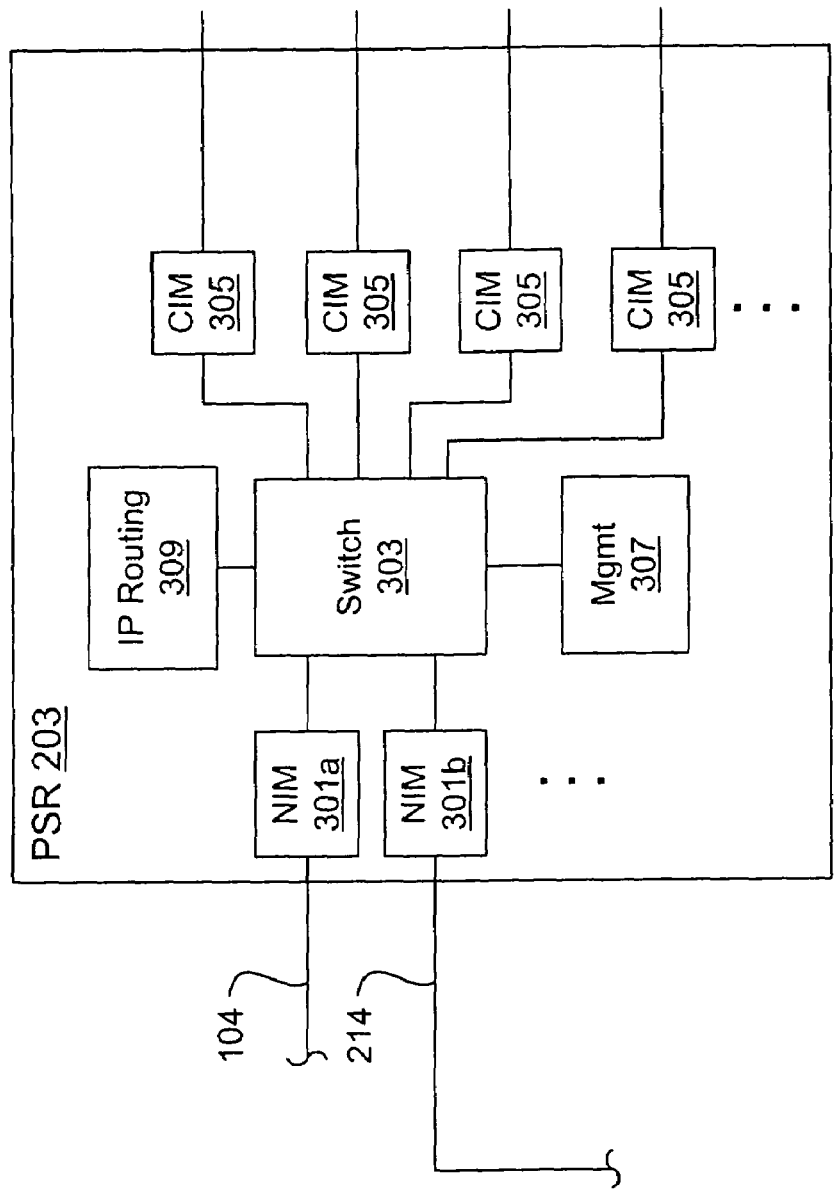
FIG. 3 is a functional block diagram of an exemplary packet switch router implemented according to an embodiment of the present invention.

FIG. 3 is a functional block diagram of an exemplary PSR 203 implemented according to an embodiment of the present invention. The PSR 203 is deployed at a point of targeted service insertion, which is usually at one or more of the distribution hubs 105 in an HFC configuration. Targeted services are those services intended for a subset of the entire HFC network subscriber base, such as VOD services or the like. Targeted services are contrasted with broadcast services where a given signal that originates from an upstream source, such as the headend 103, to potentially serve all subscriber destinations 109 within the general serving area of the communication system 100. Analog and digital audio and video services are examples of broadcast services. It is noted that many details specific to cable transport, such as MPEG over ATM over SONET transport (e.g. digital television or VOD services), are not shown in the interest of focusing on the elements within the cable network that are central to packetized data transport.

The PSR 203 includes one or more network interface modules (NIMs) 301, each configured to interface and terminate a particular network communication architecture. As shown, NIM 301a is coupled to the communication link 104 to enable communications with upstream sources, such as any of the sources 101 and/or the headend 103, etc., either directly or via the switch 201. The NIM 301a, for example, may include a physical interface, such as a Gigabit Media Independent Interface (GMII) conversion device (not shown) that converts between a 1000Base-X fiber optic connection. In the Ethernet embodiment, the NIM 301a terminates the GMII with an IEEE 802.3 Gigabit Ethernet Media Access Control (MAC) entity and exchanges Ethernet frames with the GMII conversion device. Another NIM 301b is provided to interface one or more of the local content servers 209–215 via the appropriate communication standard, such as 100 or 1000Base-T Ethernet connections or links 214 previously described. The PSR 203 may be implemented in a scalable manner to allow additional NIMs 301, each configured to interface a separate network media, protocol or architecture. In general, the NIMs 301 provide network interfaces to a high-speed local, metro or wide area networks (LANs, MANs, WANs, etc.)

Each NIM 301 includes a physical interface for network connectivity and integrated IP forwarding engines that forward traffic between a network interface port and a switch 303. The NIM functionality also includes physical encoding and link layer framing. The switch 303 is coupled to one or more channel interface modules (CIMs) 305, where each CIM 305 interfaces a corresponding combiner/TX 205. The switch 303 forwards downstream information from the NIMs 301 to a selected one of the CIMs 305, and forwards upstream information from the CIMs 305 to one or more of the NIMs 301. As described further below, each of the CIMs 305 adapts IP packets for synchronous downstream transmission and extracts IP packets from synchronous bit streams in the upstream direction. Each of the CIMs 305 forwards downstream data to at least one combiner/TX 205 and receives upstream data from at least one splitter/RX 205.

As described further below, for transmission in the downstream direction, each CIM 305 performs packet encapsulation, forwarding, broadband packet encapsulation, channelization, encoding, modulation and additional RF functions. For transmission in the upstream direction, each CIM 305 performs similar and inverse functions.

Each CIM 305 supports multiple downstream physical channels combined and upconverted to a common carrier signal provided to a corresponding combiner/TX 205 via a single connector. In one embodiment, for example, the CIM 305 provides 8 QAM-256 modulated 6 MHz channels, where the corresponding combiner/TX 205 combines the outputs of one or more CIMs 305. In an exemplary embodiment of the communication system 100 that supports television broadcast content in the 54–550 MHz range, the output of each CIM 305 resides within the 550–750 MHz or 550–860 MHz range. The combined physical channels are typically contiguous. In a particular example, if the QAM signals have carrier frequencies of 600, 606, 612, 618, 624, 630, 636, and 642 MHz, then the output of the CIM 305 occupies the 597–645MI-Iz spectrum. An adjacent CIM 305 may have carrier frequencies of 648, 656, 662, 670, 678, 686, 694, and 702 MHz occupying the 645–705 MHz spectrum. As a result, the corresponding combiner/TX 205 combines the 51–537 MHz broadcast spectrum with the 597–645 MHz or 645–705 MHz output of one CIM 305 or the 597–705 MHz outputs of the two adjacent CIMs 305. The resulting RF signal is converted to an optical signal and transmitted to a corresponding node 107 by an optical transmitter. It is noted that since each PSR 203 provides a targeted service with spectrum that is only unique to a particular node 107 served by an optical transmitter corresponding to a PSR output, the same frequencies may be used for transmission across multiple outputs of each hub 105.

The switch 303 and its interface to the NIMs 301 and CIMs 305 may be implemented in accordance with any one of many different configurations, where the present invention is not limited to any specific configuration. In one exemplary embodiment, the switch 303 is implemented in accordance with the Common Switch Interface (CSIX) specification, such as CSIX-L0, CSIX-L1, CSIX-L2, etc. The switch 303 and each N-IM 301 and CIM 305 communicate across a common bus or cross-bar switch (not shown) or the like using CFrames in accordance with the applicable CSIX specification.

The switch 303 executes routing algorithms and performs system management and control functions, either internally or via a separate IP routing block 307 and a separate management block 309. The switch 303 distributes routing tables to IP forwarding engines located on each NIM 301 and CIM 305 via the illustrated connections or through a separate control bus or serial link or the like. The switch 303 also incorporates switch fabric that provides connectivity for traffic between the NIMs 301 and the CIMs 305. The switch 303 may include 10/100 Base-T Ethernet and asynchronous interfaces for management connectivity. In one embodiment, the switch 303 includes a high-speed, synchronous, bi-directional, serial crossbar switch that performs the centralized switching function in the PSR 203. The switch 303 includes a fabric controller that is responsible for scheduling and arbitration in the switch fabric architecture. The fabric controller manages the connections through the switching fabric using an appropriate scheduling algorithm that is designed to maximize the number of connections per switching cycle. Management functions may be handled within the switch 303 or by another management module 307 as illustrated. Each of the NIMs 301 and CIMs 305 may be coupled to the management module 307 via separate management connections (not shown).

Figure 4:
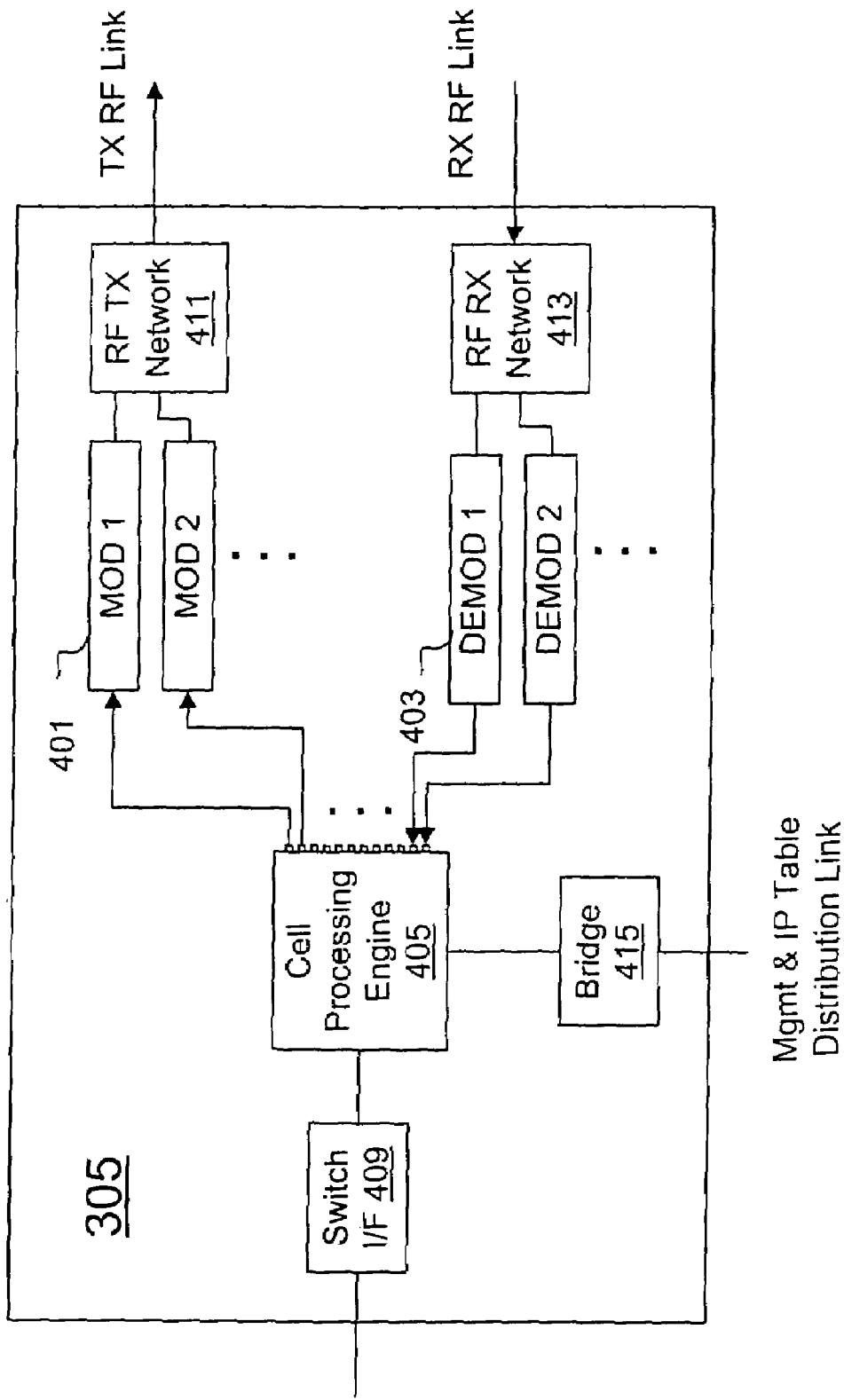
FIG. 4 is a functional block diagram of an exemplary embodiment of any of the channel interface modules of FIG. 3.

FIG. 4 is a functional block diagram of an exemplary embodiment of a CIM 305. The CIM 305 forwards IP packets and performs packet framing and channelization. In addition, the CIM 305 performs the associated digital signal and RF processing for transmission over the network architecture. Each CIM 305 includes a cell processing engine 405 that interfaces the switch 303 via a switch interface 409. The cell processing engine 405 may include supporting internal or external memory for table-lookups, queued data payload buffer descriptors and data payload buffer storage. Such memory may include any combination of read only memory (ROM) or random access memory (RAM) devices. The cell processing engine 405 processes each packet transferred between the network interface via the splitter/RX 207 and the switch interface 409. The cell processing engine 405 functionality includes 11 forwarding, link layer framing and physical layer encoding for transmission to the combiner/TX 205 or to switch interface 409 for transmission to the switch 303. In addition, the cell processing engine 405 performs physical and link layer framing.

The CIM 305 also includes multiple modulators (MOD) 401 and multiple demodulators (DEMOD) 403 coupled to the cell processing engine 405 to enable broadband modulated transmission of packetized data. In one embodiment, the modulators 401 perform continuous-mode randomization, error encoding, interleaving and 256-point QAM, for data transmission via the network. The outputs from the modulators 401 are combined in the frequency domain by an RF transmitter network 411, which provides a single combined output via a corresponding transmitter RF link. Such analog RF processing includes filtering, frequency combining and mixing. Likewise, the demodulators 403 receive upstream information through a corresponding splitter/RX 207 via an RF receiver network 413. The RF receiver network 413 processes analog RF signals, where such processing includes frequency tuning, filtering and mixing. The demodulators 403 perform similar and inverse functions of the modulators 401 and will not be further described. The number of modulators 401 and demodulators 403 may be the same for symmetrical embodiments, although the present invention contemplates any number of transmitters and receivers depending upon the particular architecture and configuration.

In the downstream direction, the cell processing engine 405 forwards an IP packet from the switch interface 409 to the appropriate channel based on destination IP address. As described further below, the cell processing engine 405 performs data link layer encapsulation using a packet adaptation procedure (PAP) to encapsulate IP packets into frames. The cell processing engine 405 adapts the frames for cell transport suited for encoding using a cell convergence procedure (CCP). In the exemplary embodiment shown, such encoding is according to the Reed-Solomon (RS) encoding procedure. The cell processing engine 405 also performs time division multiplexing of dedicated time slots within each physical downstream channel. The cell processing engine 405 adapts IP packets for synchronous transmission and extracts IP packets from synchronous bit streams. Each subscriber channel is a bi-directional data link layer communications channel between the PSR 203 and the CPE of each subscriber destination 109 served by the PSR 203.

In the illustrated embodiment, (204, 188) RS encoding for 188-byte cell transport is employed although other types of encoding or other variations are contemplated, such as, for example, (255,239) RS encoding. The PAP encapsulates each IP packet prior to transmission by pre-pending a PAP header to the IP packet to formulate PAP frames. The CCP adapts the resulting PAP frames for RS payload insertion by dividing PAP frames into segments and inserting a header to each segment. The CCP header is a pointer offset field that indicates the location of the first byte of a PAP header within the RS payload.

Figure 5:
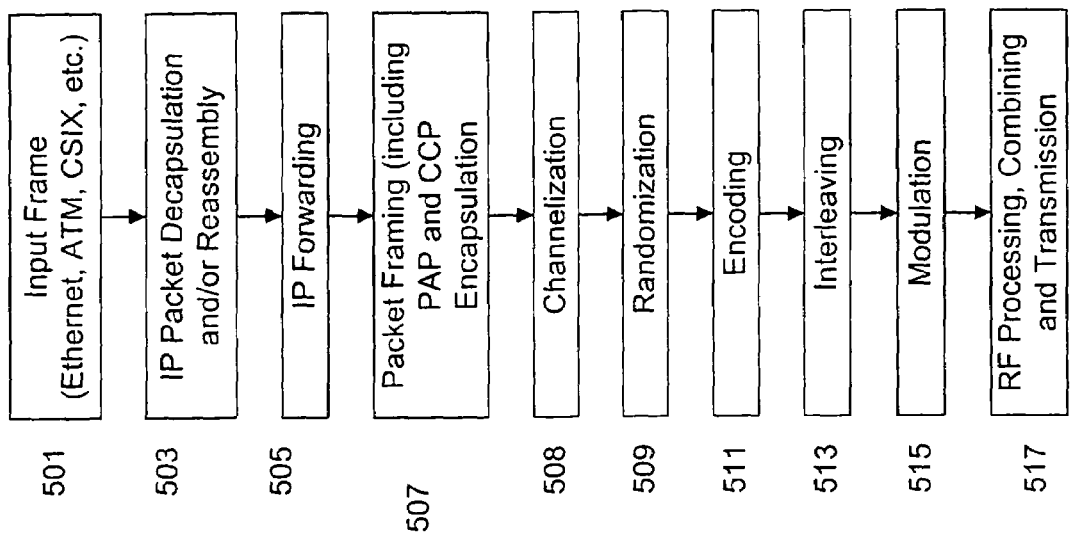
FIG. 5 is a flowchart diagram illustrating downstream cell processing performed by the channel interface modules of FIG. 3.

FIG. 5 is a flowchart diagram that summarizes downstream packet processing performed by the CIM 305. The CIM 305 performs a series of protocol functions upon the ingress frames, adapting IP packets into synchronous bitstreams for transmission over a corresponding channel. The general process illustrated is agnostic relative to the type of packets or frames; such as Ethernet frames, ATM cells, CSIX frames, etc. At a first block 501, an input frame is received by the cell processing engine 405 via the switch interface 409. The cell processing engine 405 performs IP packet decapsulation and/or re-assembly at next block 503, where particular processing depends upon the particular packet data format. For example, multiple CSIX cells each having equivalent payloads on the order of 100 bytes are first decapsulated to retrieve the IP packet payloads, which are then re-assembled together to formulate the original IP packet. A similar process may be performed for Ethernet frames, although one or more IP packets may be entirely encapsulated within a single Ethernet frame. In any event, the resulting IP packets are forwarded to an appropriate channel corresponding to the destination address indicated in an IP header at next block 505. In one embodiment, the cell processing engine includes separate channel processing modules or blocks are for each channel. Alternatively, the cell processing engine 405 separates the channels within its memory.

For each channel, the cell processing engine 405 performs packet framing at next block 507. Such framing processing includes the PAP and CCP procedures to encapsulate the IP packets into frames and to adapt the frames into cells for cell transport suited for encoding. The resulting cells are then channelized by the cell processing engine 405 at next block 508. Such channelization implements TDM within predetermined or pre-assigned time slots as further described below in accordance with dedicated data throughput subscriber channels. The resulting channelized data stream of cells is provided to a corresponding one of the modulators 401. The cell processing engine 405 performs the same process for each physical channel handled by a corresponding one of the modulators 401. Each modulator 401 performs continuous-mode randomization (block 509), error encoding (block 511), interleaving (block 513) and modulation (block 515) for data transmission. These functions are described more fully below.

At next block 517, the digital data output from each of the modulators 401 are provided to the RF transmitter network 411 for RF processing and transmission. In particular, the RF transmitter network 411 maps the data into code words, converts the code words into a waveform, and modulates the waveform to an Intermediate Frequency (IF), such as between 30 MHz and 60 MHz. The IF signal is then upconverted to any one of several 6 MHz channels within the applicable frequency range (550–860 MHz for the consumer broadcast television embodiment) by an up converter (not shown). In one embodiment, two stages of up conversion are used to achieve desired signal-to-noise levels. The upconverted signal is amplified and equalized for transmission over the TX RF link. The RF transmitter network 411 performs RF aggregation and provides the ability to operate anywhere within the applicable downstream frequency range based on software configuration. The RF transmitter network 411 outputs an RF signal that incorporates the combined information from each of the modulators 401.

Although not further described herein, a similar and opposite process is performed by the CIM 305 in the upstream direction. The RF receiver network 413 includes an RF tuner and down converter (not shown) that tunes to a corresponding 6 MHz upstream frequency employing phase-lock-loop (PLL) techniques or the like. The RF receiver network 413 selects RF channels in the applicable frequency range (5–42 MHz for the consumer broadcast television embodiment) used for upstream transmission. In one embodiment, the RF receiver network 413 provides the ability to operate anywhere within the applicable downstream frequency range based on software configuration. The RF receiver network 413 further band pass filters and down converts the signal to the IF for use by a demodulator (not shown) within each demodulator 403. Each demodulator 403 demodulates a corresponding IF signal employing a particular modulation scheme, such as QAM-64 or QAM-256 or the like and forwards the demodulated signal to a decoder/descrambler (not shown). The descrambler descrambles the resultant signal and decodes the data link encapsulated IP data stream, such as using RS decoding or the like. The decoded cells are forwarded to the cell processing engine 405, which performs time division de-multiplexing of dedicated time windows corresponding to upstream channel slots within each physical channel. The cell processing engine 405 further performs an inverse CCP and data link layer decapsulation of resultant IP frames using an inverse PAP. The resulting IP packets are forwarded to the switch 303 via the switch interface 409.

Figure 6A:
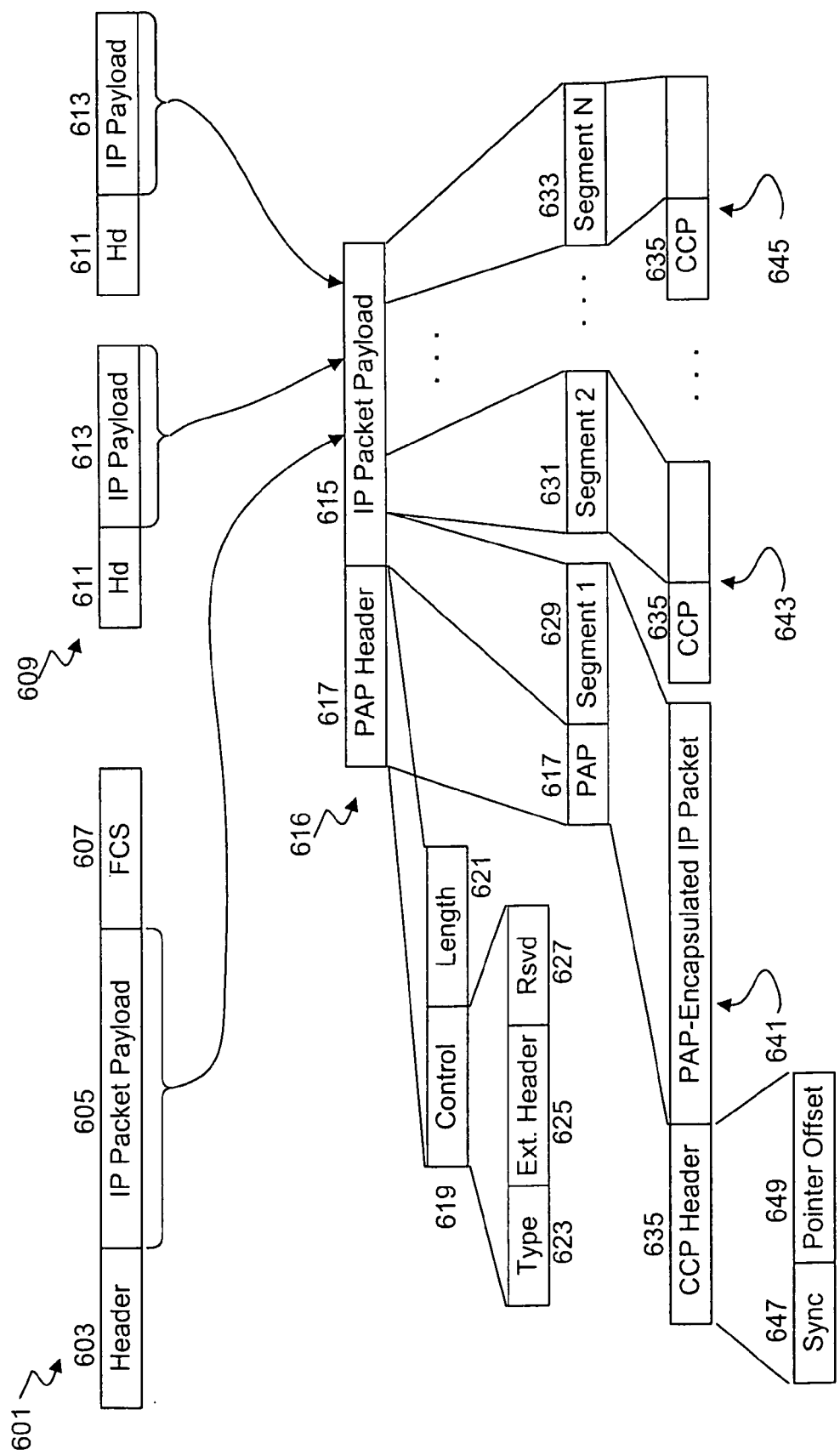
FIG. 6A is a block diagram illustrating IP packet decapsulation and cell encapsulation for downstream transmission by the cell processing engine of FIG. 4.

FIG. 6A is a block diagram illustrating packet decapsulation and cell encapsulation for downstream transmission by the cell processing engine 405. As further described below, synchronous, byte-oriented processing utilizes packet and cell headers to allow variable-length IP packets to be transported across the network as a series of payload cells. These packet and cell headers provide the destination with enough information to reassemble the individual cells back into the original IP packets to decode the message. The adaptation and convergence procedures, described further below, also perform null packet generation and added error protection. It is understood that although the present invention is illustrated with IP packets, the present invention applies to any type of digital information, including various types of packetized information and data packets.

In one embodiment, an exemplary Ethernet encapsulated protocol data unit (PDU) 601 is shown including a header 603, an IP packet payload 605 and a Frame Check Sequence (FCS) 607 or the like. The IP packet payload 605 is decapsulated from the Ethernet frame 601 and forwarded to the appropriate channel within the cell processing engine 405 corresponding to a destination address in the header 603. The IP packet payload 605 becomes all or a portion of an 11 packet payload 615 of a PAP frame 616 further described below. For an Ethernet embodiment, the header 603 may include an 8 byte preamble, a 6 byte destination address, a 6 byte source address, a 2 byte length, an optional 8 byte Logical Link Control Sub-Network Access Protocol (LLCSNAP) header, a 1,492 or 1,500 byte IP packet payload and a 4 byte FCS. The preamble, addresses, length and FCS fields form Ethernet framing. The Ethernet PDU 601 is a maximum of 1526 bytes with 1,492 or 1,500 bytes of payload. Since an packet may be up to 64 kilobytes (KB) in length, the packet payload 605 may not include the entire contents of the original IP packet. If so, multiple Ethernet PDUs are decapsulated and the corresponding multiple IP packet payloads are re-assembled into the original IP packet. This process is also known as defragmentation.

To verify the validity of the IP packet payload for Ethernet PDUs, the cell processing engine 405 utilizes both the FCS field and an IP Checksum field within the IP packet payload 605. For example, the FCS field is used to verify that the Ethernet PDU traversed the network without incurring any bit errors. The FCS is useful for detecting and protecting against synchronization errors as well as transmission errors. The cell processing engine 405 performs a polynomial calculation on the bits of the Ethernet Address, Length, LLCSNAP, and IP packet payload fields, and compares the resulting 32-bit value with the value stored in the FCS field. If the two values do not match, the cell processing engine 405 discards the Ethernet PDU. To further verify the validity of the embedded IP packet payload, the cell processing engine 405 may use an error-detecting summing algorithm. If so, the cell processing engine 405 considers the entire header 603 as a sequence of 16-bit words, adding them up using ones complement arithmetic and taking the ones complement of the result. If the resulting checksum value does not equal the value stored in the 1 checksum field, the cell processing engine 405 assumes an error has occurred during transmission and discards the Ethernet frame.

The decapsulation process is not limited to Ethernet and similar or alternative decapsulation processes are contemplated. For example, in an alternative embodiment, the cell processing engine 405 receives a series of cells 609, such as CSIX type ceils (CFrames) or the like. Each cell 609 includes a header 611 or the like and an IP payload 613 incorporating all or a portion of an original IP packet. The IP payload 613 from one or more cells 609 is extracted and reassembled to form the Packet Payload 615 of the PAP frame 616. Each header 611 includes similar type information as the Ethernet PDU 601, where such information may be utilized to perform error checking and/or correction in a similar manner as described above. The header 611 also includes a destination address or the like to facilitate IP forwarding in a similar manner. A similar process may be employed for ATM cells or any other type of packetized information utilized within the PSR 203.

The cell processing engine 405 performs the PAP to generate the PAP frame 616, in which a PAP header 617 is appended to the front of the IP packet payload 615. This process is referred to as "framing" or encapsulation. In one embodiment, the PAP header 617 is 3 bytes long, including of a 1-byte control field 619 and a 2-byte length field 621. The control field 619 further includes a packet type field 623 (4 bits), an extended header field 625 (1 bit), and a reserved field 627 (3 bits). The length field 621 specifies the number of bytes in the IP packet payload 615. The PAP accomplishes inter-packet time fill by generating null packets with the type field 623 set to null values or zero (0) bits. This ensures synchronous transmission and helps eliminate the DC offset of baseline wander. Furthermore, the PAP may provide additional error correction by using simple parity on the PAP header 617 with one of the reserved bits 627 of the control field 619.

In preparation for encoding, the cell processing engine 405 performs the CCP, which conducts a segmentation process by accumulating the PAP-encapsulated IP bit-stream into "N" segments 629, 631, . . . , 633, where N is a positive integer and depends on the size of the PAP header 617 and the IP packet payload 615. It is noted that N may be one (1) in which an EP packet is below a predetermined size and need not be divided further for insertion into cells, as further described below. It is noted that although the segments may be mostly equal in size, at least one segment is usually smaller since the IP packets are variable in size and not an exact multiple of a chosen segment size (e.g., a remainder segment). A smaller segment is made equivalent in size by padding it with zeroes or null values in preparation for the CCP. The PAP header 617 is appended to or otherwise forms part of a first segment 629. The CCP then attaches CCP headers 635 to the beginning of each of the segments 629–633 to form corresponding CCP cells 641, 643, . . . , 645.

In one embodiment employing (204, 188) RS encoding, each CCP cell is 188 bytes in length. The relative sizes of the CCP header 635 and the remaining segment may vary, where each segment may be 185 or 186 bytes in length. Each CCP header 635 includes a synchronization value or "sync" byte 647 and a pointer offset field 649 (1 byte) that identifies the beginning of the next PAP header. An optional control byte may be employed, but will not be further described. If the pointer offset value in the pointer offset field 649 is within the appropriate range, the next IP packet begins in the current cell. In a configuration in which the segments are 185 bytes in length, the appropriate range of the pointer offset value is 0 to 185, inclusive, for (204, 188) RS encoding. If the pointer offset value is equal to the maximum value of 204, thereby pointing to the following cell's CCP header, the next IP packet does not begin in the current CCP cell. Pointer offset values within the remaining range (186 to 203 inclusive) are considered invalid or are otherwise unused. It is noted that (255, 239) RS coding is also contemplated, where the size of each CCP cell is 255 bytes so that the relative sizes of the payloads and fields are changed accordingly.

Figure 6B:
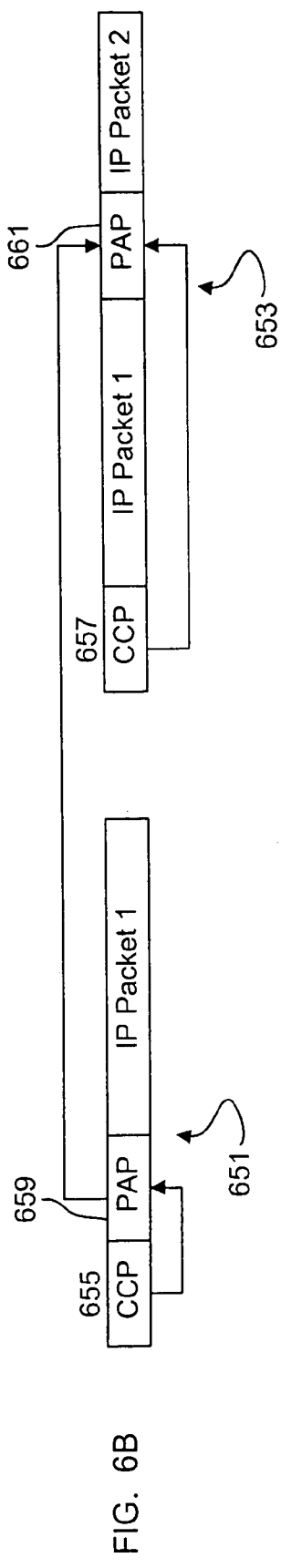
FIG. 6B is a block diagram illustrating CCP and PAP header agreement between successive CCP cells.

FIG. 6B is a block diagram illustrating CCP and PAP header agreement between successive CCP cells 651 and 653. To ensure that the CPE of the subscriber destination 109 can reliably reassemble IP packets from a series of individual CCP cells, the CCP verifies that the pointer offset values and the previous PAP header's length field are in agreement. The first CCP cell 651 is followed by a subsequent CCP cell 653, each including respective CCP headers 655 and 657. The CCP cells 651 and 653 are not necessarily consecutive, in which case intermediate CCP cells include a CCP header with the maximum value. The first CCP cell 651 includes a PAP header 659 and a corresponding first portion of an IP packet 1. The CCP header 655 includes a pointer offset value indicating the position of the PAP header 659 within the CCP cell 651. The PAP header 659 includes the length field 621 defining the length of packet 1, and therefore indicates the location of a subsequent PAP header 661 within the subsequent CCP cell 653. The PAP header 661 is located at the beginning of the next subsequent IP packet 2. The CCP header 657 includes a pointer offset value indicating the position of the PAP header 661 within the CCP cell 653. Thus, the CCP verifies that the CCP header 657 and the PAP header 659 are in agreement as to the location of the next PAP header 661.

Figure 7A:
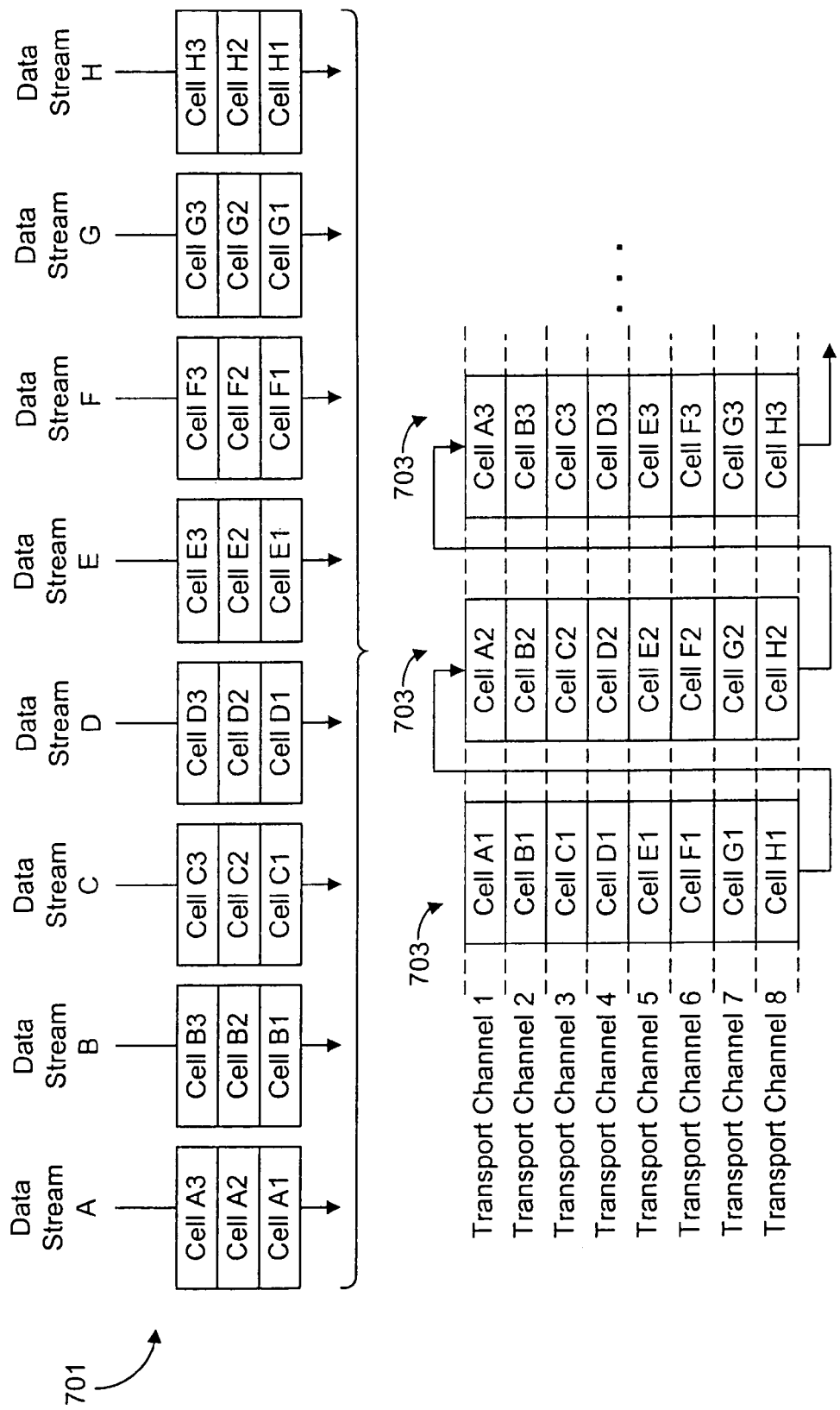
FIG. 7A is a block illustrating multiplexing of a physical channel for handling multiple data streams, where each stream is assigned a corresponding transport channel to formulate a multiplexed cell stream.

FIG. 7A is a block illustrating time division multiplexing of a physical channel for handling multiple data streams, where each stream is assigned a corresponding one of multiple transport channels, and where each transport channel comprises a series of corresponding time slots. In this example, eight different data streams 701, individually labeled A-H, are each organized as a series of CCP cells by the cell processing engine 405. Thus, data stream A includes sequential CCP ceils A1, A2, . . . , data stream B includes sequential CCP cells B1, B2, . . . , etc. In the embodiment shown, the cell processing engine 405 organizes or channelizes the CCP cells into eight different transport channels labeled 1–8, where each transport channel includes a corresponding time slot of a predetermined number or group of repeating time slots or cell groups 703 forming an outgoing multiplexed cell stream. The data streams are handled in a round-robin manner by the cell processing engine 405. The repeating cell groups 703 form a a multiplexed cell stream generated by the cell processing engine 405. The resulting multiplexed cell stream is sent by the cell processing engine 405 to a corresponding one of the modulators 401. In this manner, data stream A, including CCP cells A1, A2, A3, etc., is transmitted in transport channel 1. Likewise, data streams B-H are each transmitted in transport channels 2–8, respectively. In the exemplary embodiment, each data stream is thus allocated ⅛ of the total bandwidth of the multiplexed cell stream of the physical channel. If the physical channel has a total data throughput of approximately 40 Mbps assuming QAM-256 modulation, then each transport channel effectively allocated approximately 5 Mbps. It is noted that the assignment of data streams to transport channels is arbitrary, so that any data stream may be assigned to any transport channel. Data stream A, for example, may be assigned to any of the transport channels 2–8 rather than transport channel 1.

It is appreciated that the number of transport channels and the number of data streams need not correspond or be equal. For example, a larger number of data streams may be handled by the cell processing engine 405 using a smaller cell group size by subdividing a series of corresponding time slots into multiple transport channels. For example, the transport channel 8 shown populated with cells from the data stream H may be subdivided into two different transport channels 8 and 9 for handling the data stream and an additional data stream I (not shown), respectively, where the data streams H and I are allocated 1/16 of the total bandwidth. The respective transport channels 8 and 9 would each include every other 8th time slot in the multiplexed data stream. It is noted, however, that the cell group size and the number of transport channels could simply be changed to nine (9), so that each of the nine data streams are allocated an equal ⅑ of the total bandwidth. It is not required that the size of the transmission window be the same length of the TDM frame. In this manner, it is understood that each transport channel 1–8 need not be dedicated to or correspond with a particular data stream, provided that the allocation is regular and synchronous to maintain the essence of TDM.

Figure 7B:
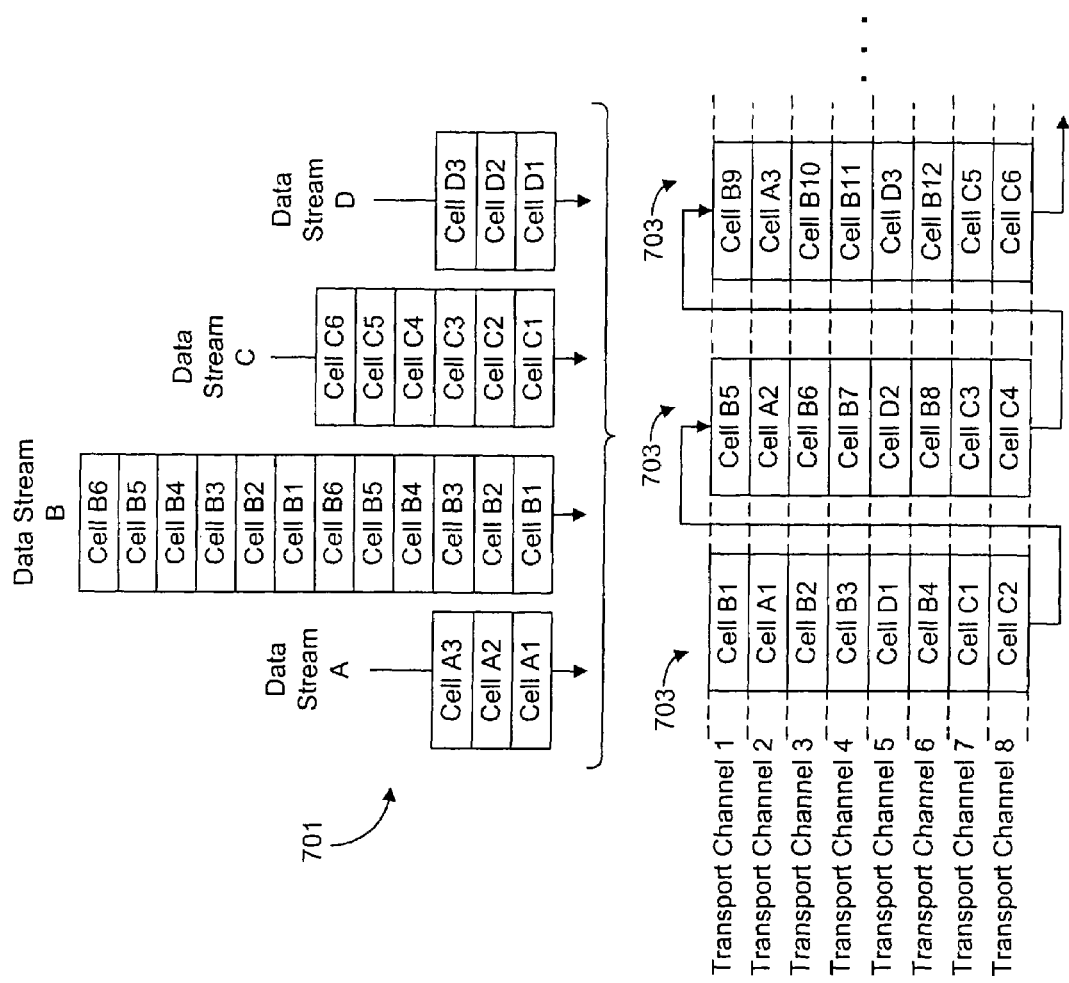
FIG. 7B is a block diagram illustrating multiplexing of a physical channel for handling multiple data streams, where some streams are assigned multiple transport channels to formulate the multiplexed cell stream.

FIG. 7B is a block diagram illustrating time division multiplexing of a physical channel for handling multiple data streams, where some streams are assigned multiple transport channels. In this case, only four data streams are shown, labeled A-D, whereas the same number of transport channels 1–8 is defined. Also, each data stream is assigned to one or more specific transport channels. Data stream A is arbitrarily assigned transport channel 2 for ⅛ of the data throughput of the physical channel, data stream B is assigned transport channels 1, 3, 4 and 6 resulting in 4 of the 8 channels or ½ of the data throughput, data stream C is assigned transport two channels 7 and 8 for ¼ of the data throughput, and data stream D is assigned single transport channel 5 for the final ⅛ of the data throughput. As illustrated, the first cell group 703 is populated with cells B1–B4 and C1–C2, the second cell group 703 is populated with cells B5–B8 and C3–C4, and so on to maintain proper ordering of the cells for each data stream. It is appreciated that the data streams are handled in a weighted round-robin manner.

In general, given a cell group size of n, (where n=8 in FIG. 7A and corresponds to the number of time slots in each cell group), each data stream corresponding to a subscriber destination 109 may be assigned any one or more of the n transport channels to achieve a corresponding bandwidth or data throughput. It is contemplated that less than 1/n data throughput may be achieved by assigning a data stream to less than one complete series of corresponding time slots (thereby creating multiple transport channels for a given stream of corresponding time slots), such as every other slot or every fourth slot or the like in a given stream of corresponding time slots. It is also possible to assign a subscriber destination 109 greater bandwidth than a given physical channel by allocating at least part of a second channel. This later embodiment, however, would require that the CPE at a subscriber destination 109 be capable of tuning to more than one frequency channel. In one embodiment, a lookup table or the like is used to create an association between each logical channel associated with an IP address or subscriber destination and one or more physical timeslot channels. A time slot value may be used as an index to retrieve the assigned logical channel from the lookup table. In this embodiment, network management populates the lookup table prior to using the physical channel. The cell processing engine 405 utilizes the programmed values to allocate bandwidth to each data stream received. It is noted, as further described below, that the input data may generally be asynchronous and intermittent or "burst/". In this manner, input data is not always available to populate the CCP cells in each data stream. Partial cells may be padded with zeroes or null values to formulate full cells. Also, the cell processing engine 405 may generate null cells to fill in gaps of input data to create a continuous multiplexed cell steam created by the channelization process.

Figure 8:
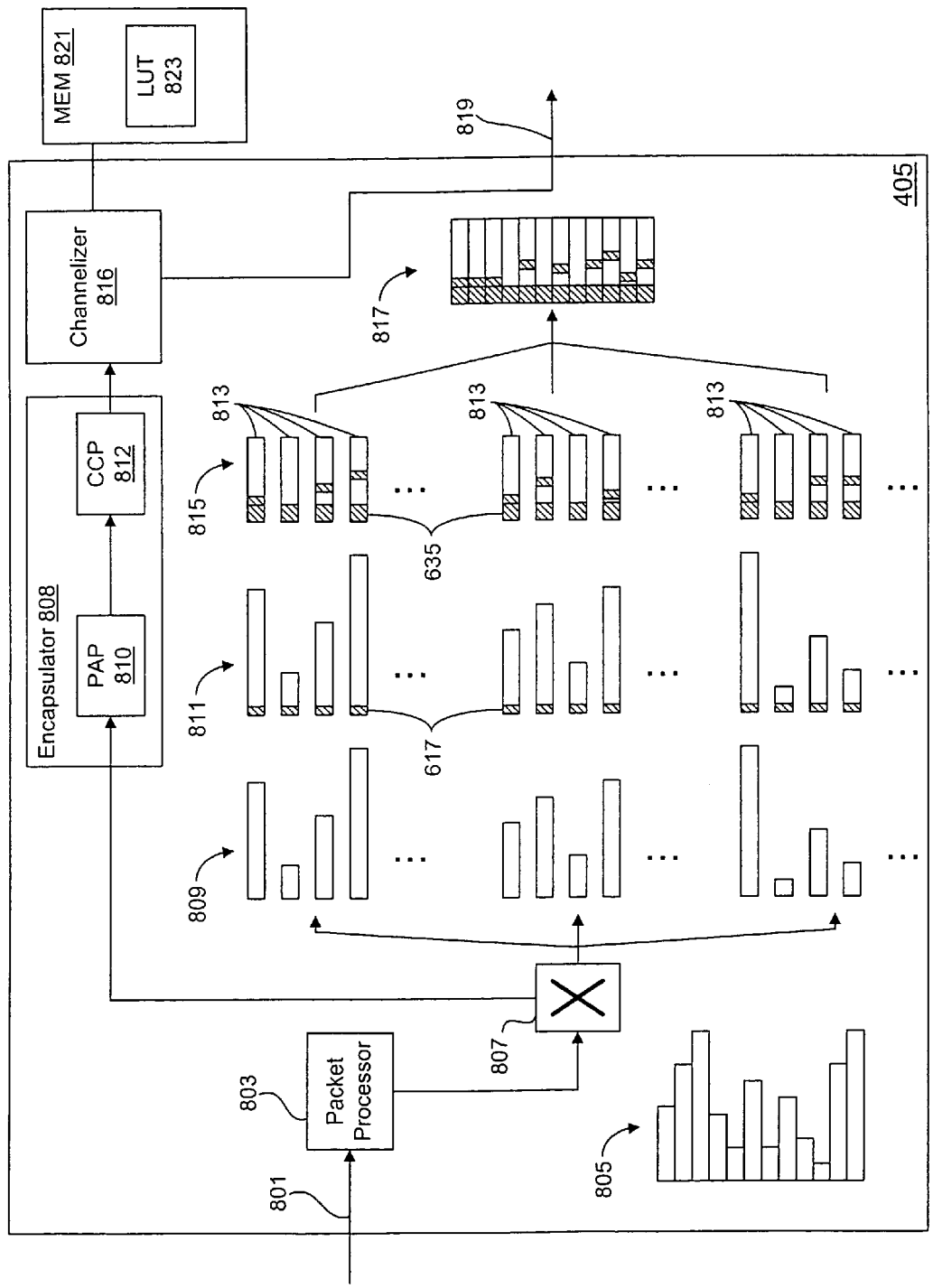
FIG. 8 is a block diagram illustrating the main components and summarizing operation of the cell processing engine of FIG. 4.

FIG. 8 is a block diagram illustrating main components and summarizing operation of the cell processing engine 405 of FIG. 4. Packets, frames or PDUs or the like are received by the cell processing engine 405 as shown at 801, such as via the switch interface 409. The cell processing engine 405 includes a packet processor 803 that performs decapsulation and/or re-assembly, resulting in a stream of IP packets as shown at 805. The term "processor" as used herein does not necessarily denote a specific processing device or unit, but simply denotes any logic, circuitry, code, software, etc. that is configured to perform the functions described. The IP packet stream is provided to a switch device 807 or the like that performs the forwarding function, resulting in multiple streams of IP packets, as shown at 809. The multiple streams of IP packets are provided to an encapsulator 808 that further includes a PAP processor 810 and a CCP processor 812. The PAP processor 810 performs the PAP on each data stream of IP packets, adding a PAP header 617 to each packet, resulting in corresponding streams of PAP frames 616 as shown at 811. The CCP processor 812 then performs the CCP on each data stream of PAP frames, segmenting the PAP frames into segments, and adding CCP headers 635 to each segment in each stream, resulting in corresponding streams of CCP cells 813 as shown at 815. The one or more streams of CCP cells 813 are then provided to a channelizer 816, which performs the channelization function to form a multiplexed stream of cells as shown as 817. The cell processing engine 405 sends the multiplexed stream of cells to a corresponding modulator 401 as shown at 819.

A memory 821, such as any combination of random access memory (RAM) or read-only memory (ROM), may be incorporated within or provided externally to the cell processing engine 405. The memory 821 is a programmable device that stores values, variables, data, or other parameters utilized by the cell processing engine 405 during operation. The memory 821 may store a lookup table (LUT) 823, that further includes time slot assignments for each data stream. In a particular embodiment, the LUT 823 maps timeslots to destination IP addresses corresponding to each data stream, where the destination IP addresses each correspond to a subscriber destination 109.

It is noted that only a subset of data for a single frequency channel is shown, where it is understood that a greater number of data streams may be processed for each channel, and that multiple frequency channels may be included as desired. It is further noted that the input data, in the form of packets, frames or PDUs or the like, generally arrives asynchronously and intermittently. One or more data streams may have no input data at all. Also, the packetized data may have variable sizes. IP packets, for example, are varied in size. In one embodiment, the cell processing engine 405 outputs a continuous and synchronous steam of multiplexed cells for each channel to a corresponding modulator. Thus, some of the ceils may be partially filled with data, where the remaining portion of the cell is filled with zeroes or null values. Also, during periods in which no input data is available for a given data stream, the cell processing engine 405 outputs null cells to the modulator. In this manner, one or more asynchronous steams of downstream data is converted to a synchronous streams of data cells that are modulated into corresponding frequency channels.

Figure 9A:
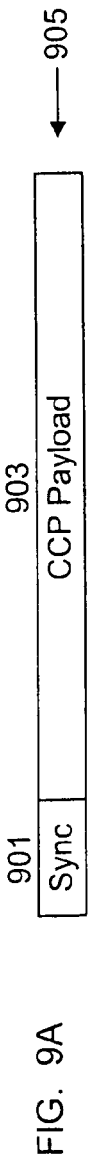
FIGS. 9A–9C illustrate the relationship between the scrambling, encoding and the interleaving process performed by each modulator 401 with the cell convergence process performed by the cell processing engine of FIG. 4.
Figure 9B:
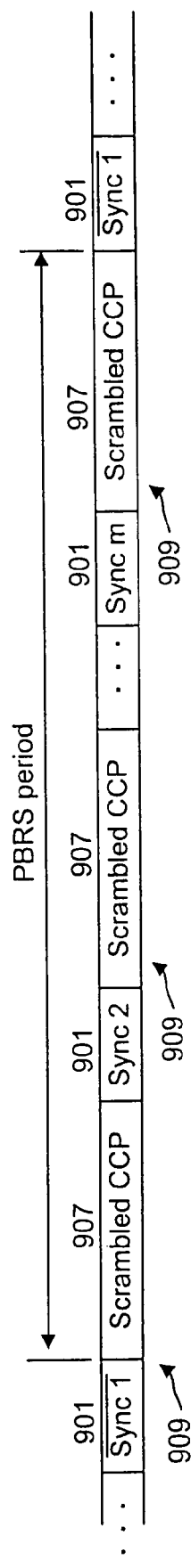
Figure 9C:
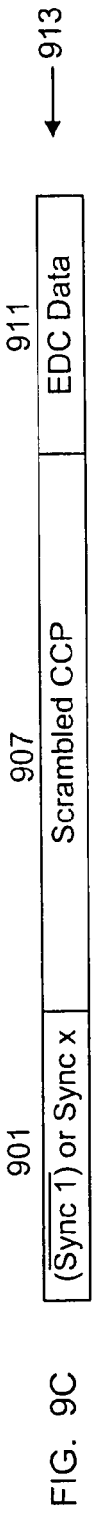

FIGS. 9A–9C illustrate the relationship between the scrambling, encoding and the interleaving process performed by each modulator 401 with the framing process performed by the cell processing engine 405. An exemplary CCP cell 905 is illustrated in FIG. 9A including a sync byte 901 followed by a CCP payload 903. In exemplary embodiments, most of the aspects of the digital coding and modulation functionality of the modulators 401 is based on the ITU J.83 Annex A recommendation (hereinafter "the ITU J.83 specification"). The ITU J.83 specification defines the framing structure, channel coding and modulation for digital television, audio and data signals distributed by cable networks possibly in frequency-division multiplex (FDM). Such standard transmission techniques may be employed in order to leverage existing off-the-shelf technology. It is noted, however, that the present invention contemplates any type of digital coding and modulation functionality other than that described in the ITU J.83 specification. In one embodiment, the digital coding and modulation functionality performed by each modulator 401 described herein is based on the synchronization method provided in the ITU J.83 specification, which assumes an underlying MPEG framing format. As a result, MPEG framing is not necessarily used in transmission. Instead, the CCP sync byte is used to "spoof" an MPEG stream, which allows the use of a standards-based synchronization method. By using an industry-standard synchronization technique, off-the-shelf components can be leveraged in the transmission system design.

The sync byte 901 is used as a synchronization mechanism for the descrambler and decoder of the CPE at each subscriber destination 109. In the embodiment shown, there are two valid sync byte field values in which the second is a bit-wise inverted version of the first. In one embodiment employing (204, 188) RS encoding, the CCP cell 905 is 188 bytes so that the CCP payload is 187 bytes. In a more particular embodiment, the two valid sync byte field values are 47HEX and B8HEX, where "HEX" denotes hexadecimal notation. The sync byte of a first CCP cell in a group of cells is bit-wise inverted from 47HX to B8HEX to provide an initialization signal for the descrambler. Each group includes a designated number "m" of cells, although the present invention is not limited to any particular group size. As an example, the sync byte sequence for a succession of CCP cells for a group size of eight includes seven cells with a sync byte of 471-HEX followed by one cell with a sync byte of B8HEX.

After the channelization process, the scrambler or randomizer process is applied resulting in a sequence of scrambled CCP cells 909 as shown in FIG. 9B. Each scrambled cell 909 includes a corresponding sync byte 901 and a scrambled CCP payload 907. The randomizer process uses a predetermined polynomial for a Pseudo-Random Binary Sequence (PRBS) generator (not shown). The first sync byte 901, or each sync byte 1 of a repeating PRBS, is inverted as illustrated by an overstrike. The first bit at the output of the PRBS generator is applied to the first bit of the first byte following the inverted MPEG-2 sync byte. To aid other synchronization functions, during the sync bytes of the subsequent transport packets, the PRBS generation continues, but its output is disabled, leaving these bytes unscrambled. As a result, the period of the PRBS sequence is 1503 bytes for 188-byte CCP cells. The randomization process is also active when the modulator input bit stream is non-existent, or when it is non-compliant with the framing format. This is to avoid the emission of an un-modulated carrier from the modulator.

Following the scrambling or randomizer process, each scrambled CCP cell 909 is encoded into a codeword 913 as illustrated in FIG. 9C. The codewords are referred to as RS codewords when RS encoding is employed. The sync byte 901 is inverted for a first cell in a PRBS series, whereas the remaining sync bytes, denoted sync "x" where "x" varies from 2 to m, are not inverted. The scrambled CCP payload incorporates an error detection and correction (EDC) data 911 generated by the encoding process to provide Forward Error Correction (FEC). The RS encoding is a non-binary block coding scheme that corrects random bit and short burst errors caused by noise during transmission. RS encoding uses redundancy in a highly efficient manner, expanding each scrambled cell 909 by adding redundant data or symbols. It is noted that the EDC data 911 is not necessarily a separate field but may be intermingled with the CCP payload. For (204,188) RS encoding, the EDC field includes 16 parity or EDC bytes to achieve a (204, 188, 8) RS codeword. The EDC data for (204, 188, 8) RS encoding can correct 8 erroneous bytes per RS codeword. It is noted that the encoder also encodes the sync byte 901, where each sync byte 1 is inverted as indicated by an overstrike. A predetermined code generator polynomial and field generator polynomial are employed for the RS encoding process. It is noted that a shortened RS codeword may be implemented by appending 51 bytes, all set to zero, before the information bytes at the input of a (255, 239) RS encoder. After the coding procedure, the appended bytes are discarded.

Following the encoding process, a convolutional interleaving scheme is applied resulting in interleaved frames (not shown). In one embodiment, the resulting interleaved frames are composed of overlapping error-protected packets that are delimited by sync bytes to preserve a periodicity of 204 bytes. The frames may be interleaved in accordance with the ITU J.83 specification and will not be further described. The interleaved frames are then modulated, such as according to QAM-256 modulation as provided in the ITU J.83 specification. The QAM process adapts the synchronous, scrambled bit-stream for transmission over a channel as RF output. The QAM process blocks together bits from the data stream and then maps them into codewords using either Gray-codes or differential codes. The QAM process then converts the resulting digital codewords into an analog waveform based on a constellation diagram of combinations of amplitudes and phases, where each unique bit sequence corresponds to a point in the constellation.

It is noted that each modulator 401 receives CCP cells from the cell processing engine 405 having a particular size whereas the encoding process generates larger sized codewords. In this manner, the timing differential between the cell processing engine 405 and each modulator 401 is handled using any one of several optional methods. In a first embodiment, the cell processing engine 405 adds a time delay to each CCP cell equivalent to transmission of the size differential. For example, in an exemplary embodiment, the CCP cells are 188 bytes whereas the codewords are 204 bytes in length, so that the cell processing engine 405 adds a time delay differential equivalent to 16 bytes.

It is appreciated that each downstream channel handled by each modulator 401 has a predetermined frequency bandwidth and a corresponding data throughput. The protocol described herein has provisions to further subdivide the physical medium into multiple discrete channels using TDM. In one embodiment, such partitioning is performed on a RS codeword basis, using the MPEG-2 sync field to uniquely identify each of the multiple transport channels, in which each transport channel includes a dedicated series of time slots that are each sufficient to transmit one codeword. In this manner, multiple and separate transport channels each share a common physical channel. The entire physical channel may be used to transport information to a single destination, such as one subscriber destination 109, so that all of the transport channels are assigned to the same subscriber. Alternatively, each transport channel may be assigned to different subscriber destinations 109, so that multiple subscribers share a physical channel. However, since each subscriber destination 109 is assigned at least one dedicated transport channel, each subscriber destination 109 is provided dedicated and unshared bandwidth.

In a more specific embodiment, each CIM 305 transmits data during dedicated transport channels over 6 MHz frequency channels, where each transport channel includes a series of time slots. A time slot is defined as the time required to transmit a 204 byte Reed-Solomon codeword using QAM-256 at a symbol rate of 5.360537 Msym/sec or approximately 38 microseconds (tsec). Each 6 MHz QAM channel corresponds to a certain number of transport channels, such as 8 transport channels, which are served in a round-robin manner. During each time slot, a 204-byte Reed-Solomon payload is transmitted to an error detection encoder for (204, 188) RS encoding and consequential QAM transmission. Each connection can receive from 1 to 8 transport channels, which need not be contiguous. Consequently, bandwidth is allocated to each channel in 5.360537 Mbps increments up to 42.884296 Mbps. It is noted that each subscriber destination 109 served by a frequency channel maintains synchronicity with the transmitting CIM 305. The CPE at each subscriber destination 109 extracts data only from its assigned transport channel during the corresponding time slot(s).

Figure 10:
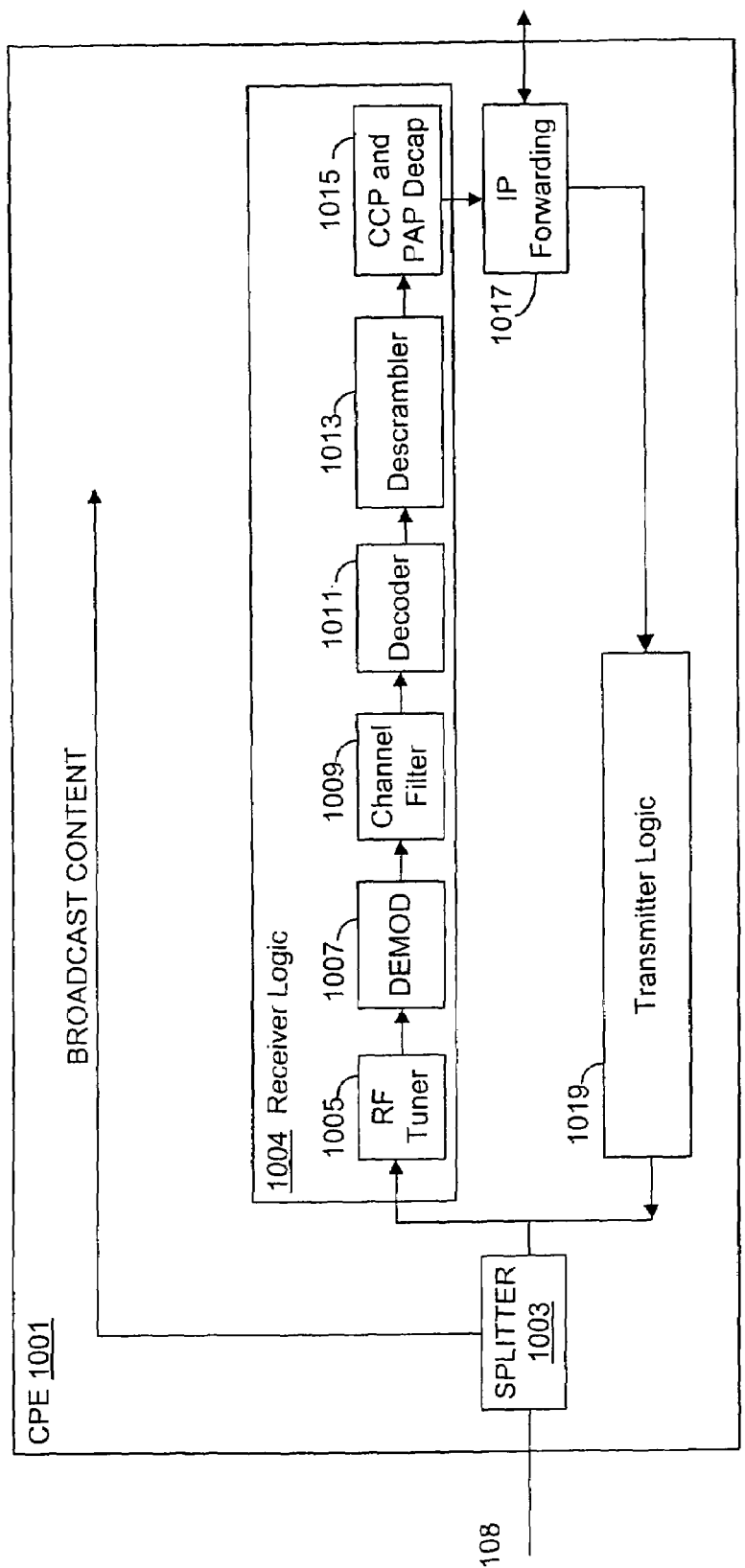
FIG. 10 is a simplified block diagram of exemplary customer premises equipment (CPE) located at each subscriber destination that tunes, decodes, and de-modulates source information from a combined electrical signal.

FIG. 10 is a simplified block diagram of exemplary CPE 1001 located at each subscriber destination 109, such as set-top boxes or cable modems or the like that tunes, decodes, and de-modulates source information from the combined electrical signal addressed or otherwise intended for the particular subscriber destination 109. The CPE 1001 may include a splitter 1003 coupled to a subscriber medium link 108 for extracting broadcast content such as analog television broadcast transmissions if transmitted. The remaining RF spectrum dedicated to subscriber channels is provided to receiver logic 1004 to extract source information. The splitter 1003 may not be included in an all-digital configuration. The receiver logic 1004 includes an RF tuner 1005 that is tuned to a corresponding physical channel transmitted by a corresponding CIM 305 of a PSR 203. For example, the RF tuner 1005 tunes to a corresponding 6 MHz channel to which it is assigned. The filtered channel signal is provided to a demodulator 1007, which generally performs the inverse modulation procedure performed by a corresponding modulator 401, such as according to QAM-256 or the like. The demodulated digital signal is then provided to a channel filter 1009 that detects the sync bytes in the data stream and extracts one or more digital codewords within each group of data that corresponds to its assigned transport channels. Although the channel filtering function may be performed later in the receiver process, early filtering may simplify the subsequent portions of the receiver logic 1004.

The filtered digital signal is provided to a decoder 1011, which performs the inverse interleaving and encoding process performed by a corresponding modulator 401, such as according to the Reed Solomon encoding process previously described. The decoded data is then provided to a descrambler 1013 to reverse the randomization process. The resulting CCP cells are then provided to CCP and PAP decapsulation logic 1015, which re-assembles the original IP packets provided to the corresponding PSR 203. The IP packets are then forwarded by IP forwarding logic 1017 to an appropriate subscriber device as indicated by a destination address. For transmission, IP packets from one or more subscriber devices are forwarded by the IP forwarding logic 1017 to transmitter logic 1019 and asserted onto the subscriber medium link 108. The upstream transmission process is not further described as beyond the scope of the present disclosure. Although various embodiments of the present invention have been described in detail, it should be understood that various changes, substitutions and alterations can be made hereto without departing from the spirit and scope of the invention as described by the appended claims.

The invention claimed is:

1. A method of providing dedicated bandwidth to a plurality of destinations, comprising:

forwarding data packets into a plurality of data streams, each data stream corresponding to one of the plurality of destinations;

framing one or more of the data packets in each data stream into a data cell, wherein one or more data cells in the same data stream form a corresponding one of a plurality of cell streams;

channelizing the plurality of cell streams into cell groups, each cell group having an equal number of time slots;

inserting data cells from one or more of the plurality of cell streams into one or more of the time slots of each cell group, thereby forming a multiplexed cell stream; and modulating the multiplexed cell stream into a modulated signal within a frequency channel.

2. The method of claim 1, wherein an original packet format for each data packet is one of IPv4, IPv6, Ethernet 802.3, Ethernet II, Ethernet 802.2, Ethernet SNAP, 802.1Q Ethernet VLAN, ATM, Frame Relay, MPLS, PPP or HDLC.

3. The method of claim 1, wherein the step of inserting data cells comprises:
inserting data cells into the time slots of each cell group in a round-robin manner.

4. The method of claim 1, further comprising:
assigning at least one transport channel to each data stream, each transport channel comprising a series of corresponding time slots; and
said inserting comprising inserting data cells from each of the plurality of cell streams into corresponding time slots of assigned transport channels.

5. The method of claim 1, wherein said framing includes appending a cell header to each data cell, the cell header including a synchronization value.

6. The method of claim 5, wherein said synchronization value is in accordance with MPLG-2 format.

7. A method of providing dedicated bandwidth to each of a plurality of destinations, comprising:
forwarding digital information into a plurality of data streams, each data stream corresponding to one of the plurality of destinations;
framing the digital information in each data stream into data cells;
multiplexing the data cells of each of the plurality of data streams into a multiplexed cell stream, wherein multiplexing the data cells of each of the plurality of data streams into a multiplexed cell stream comprises:
(a) channelizing the plurality of data streams into cell groups, each cell group having an equal number of time slots in the multiplexed cell stream;
(b) inserting data cells from each of the plurality of data streams into one or more time slots of a corresponding cell group; and
modulating the multiplexed cell stream into an analog signal.

8. The method of claim 7, wherein an original packet format for each data packet is one of IPv4, IPv6, Ethernet 802.3, Ethernet II, Ethernet 802.2, Ethernet SNAP, 802.1Q Ethernet VLAN, ATM, Frame Relay, MPLS, PPP or HDLC.

9. The method of claim 7, further comprising:
converting the analog signal to an optical signal; and
transmitting the optical signal to the plurality of subscriber destinations over an HFC network.

10. The method of claim 7, further comprising:
assigning at least one transport channel to each data stream, each transport channel comprising a series of corresponding time slots; and
said inserting comprising inserting data cells from each of the plurality of cell streams into corresponding time slots of assigned transport channels.

11. The method of claim 7, wherein said framing includes appending a cell header to each data cell, the cell header including a synchronization value.

12. The method of claim 11, wherein said synchronization value is in accordance with MPLG-2 format.

13. The method of claim 7, wherein the step of inserting data cells comprises:
inserting data cells into the time slots of each cell group in a round-robin manner.

14. A system for processing digital information at a point of distribution to provide dedicated bandwidth for each of a plurality of destinations, comprising:
an interface that receives packetized data;
a cell processing engine, coupled to the interface, comprising:
a switch that forwards the packetized data into a plurality of data streams comprised of data cells;
a channelizer that multiplexes the data cells of the plurality of data streams into a multiplexed stream of data cells, wherein the channelizer organizes the multiplexed stream of data cells into cell groups, each cell group having a plurality of assigned time slots, and inserts data cells from each of the plurality of data streams according to assigned time slots; and
a modulator, coupled to the cell processing engine, that modulates the multiplexed stream of data cells into an analog signal; and
a radio frequency (RF) transmitter network that transmits the analog signal into a frequency channel.

15. The system of claim 14, wherein an original packet format for the packetized data is one of IPv4, IPv6, Ethernet 802.3, Ethernet II, Ethernet 802.2, Ethernet SNAP, 802.1Q Ethernet VLAN, ATM, Frame Relay, MPLS, PPP or HDLC.

16. The system of claim 14, further comprising:
an optical converter that converts the analog signal to an optical signal and transmits the optical signal to the plurality of subscriber destinations over an HFC network.

17. The system of claim 14, wherein at least one transport channel is assigned to each data stream, each transport channel comprising a series of corresponding time slots, and said channelizer inserts data cells from each of the plurality of cell streams into corresponding time slots of assigned transport channels.

18. The system of claim 14, wherein the channelizer inserts data cells into the assigned time slots of each cell group in a round-robin manner.

* * * * *